(12) United States Patent
Winans et al.

(10) Patent No.: US 12,208,860 B2
(45) Date of Patent: Jan. 28, 2025

(54) ROTATIONALLY-ENGAGING TWO-PIECE UPPER CHAIN GUIDE

(71) Applicant: Eko Sport, Inc., Grand Junction, CO (US)

(72) Inventors: Scott Winans, Grand Junction, CO (US); Sean Gregory Mailen, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 66 days.

(21) Appl. No.: 17/494,219

(22) Filed: Oct. 5, 2021

(65) Prior Publication Data

US 2022/0106015 A1 Apr. 7, 2022

Related U.S. Application Data

(60) Provisional application No. 63/088,743, filed on Oct. 7, 2020.

(51) Int. Cl.
*B62M 9/00* (2006.01)

(52) U.S. Cl.
CPC ......... *B62M 9/00* (2013.01); *B62M 2009/007* (2013.01)

(58) Field of Classification Search
CPC .. B62M 2009/007; B62M 9/105; B62M 9/00; B62M 9/136; F16H 7/18
USPC ................................. 474/140, 144
See application file for complete search history.

(56) References Cited

U.S. PATENT DOCUMENTS

| | | | |
|---|---|---|---|
| 4,573,950 A * | 3/1986 | Nagano .................. | B62M 9/136 474/144 |
| 4,832,667 A | 5/1989 | Wren | |
| 5,002,520 A | 3/1991 | Greenlaw | |
| 5,460,576 A | 10/1995 | Barnett | |
| 6,354,973 B1 | 3/2002 | Barnett | |
| 7,059,983 B2 | 6/2006 | Heim | |
| 8,235,849 B2 | 8/2012 | Cranston et al. | |
| RE44,379 E | 7/2013 | Rogers | |
| 8,475,307 B2 * | 7/2013 | Bodensteiner ............ | F16H 7/08 474/111 |
| 8,491,429 B2 | 7/2013 | Cranston et al. | |
| 8,534,693 B2 | 9/2013 | Sloan et al. | |
| 8,961,342 B2 | 2/2015 | Emura et al. | |

(Continued)

FOREIGN PATENT DOCUMENTS

DE 102019101388 A1 * 7/2020 ............ B62M 9/136

OTHER PUBLICATIONS

DE 102019101388 A1 Machine Translation (Year: 2020).*

(Continued)

*Primary Examiner* — Michael R Mansen
*Assistant Examiner* — Juan J Campos, Jr.
(74) *Attorney, Agent, or Firm* — Jason H. Foster; Kremblas & Foster

(57) ABSTRACT

An assembly for minimizing the disengagement of a chain from a chain ring is disclosed. The assembly includes an inboard leg and an outboard leg. Rotation of the outboard leg relative to the inboard leg locks the inboard leg in place relative to the outboard leg. Relative rotation locks the assembly onto a shaft. The assembly may include an outboard leg that snaps into place on the inboard leg and is capable of rotating between two extreme positions.

20 Claims, 34 Drawing Sheets

(56) References Cited

U.S. PATENT DOCUMENTS

| | | | |
|---|---|---|---|
| 8,968,129 B2 | 3/2015 | Emura et al. | |
| 8,991,846 B2 | 3/2015 | Twers | |
| RE45,508 E | 5/2015 | Rogers | |
| 9,121,446 B2 * | 9/2015 | Kim | F16C 35/02 |
| 9,249,867 B2 | 2/2016 | Graziosi et al. | |
| 9,327,786 B2 * | 5/2016 | Cranston | B62J 13/00 |
| 9,714,067 B1 * | 7/2017 | Hara | B62M 9/14 |
| D794,512 S * | 8/2017 | McGarry | D12/127 |
| 9,896,157 B2 | 2/2018 | Emura et al. | |
| 9,919,765 B2 * | 3/2018 | Wickliffe | B62M 9/138 |
| 10,053,188 B2 * | 8/2018 | Staples | B62M 9/121 |
| 10,464,635 B2 * | 11/2019 | Pfeiffer | B62J 13/00 |
| 2002/0160869 A1 | 10/2002 | Barnett | |
| 2003/0060316 A1 | 3/2003 | Jiang | |
| 2004/0009835 A1 | 1/2004 | Heim | |
| 2006/0199690 A1 | 9/2006 | Gardner et al. | |
| 2007/0032324 A1 * | 2/2007 | Uchiyama | B62M 9/16 474/140 |
| 2007/0265121 A1 | 11/2007 | Gross | |
| 2009/0062049 A1 | 3/2009 | Cranston et al. | |
| 2009/0220319 A1 | 9/2009 | Weagle | |
| 2012/0142469 A1 | 6/2012 | Barefoot et al. | |
| 2012/0248730 A1 | 10/2012 | Sloan et al. | |
| 2013/0053195 A1 * | 2/2013 | Emura | B62M 9/16 474/140 |
| 2013/0053196 A1 | 2/2013 | Emura et al. | |
| 2013/0217527 A1 * | 8/2013 | Graziosi | B62M 9/16 474/140 |
| 2015/0259030 A1 * | 9/2015 | Nakano | F16H 7/18 474/144 |
| 2015/0344105 A1 * | 12/2015 | McGarry | B62M 9/16 474/140 |
| 2016/0146314 A1 * | 5/2016 | Graziosi | B62M 9/16 474/111 |
| 2017/0045121 A1 * | 2/2017 | Staples | B62M 9/121 |
| 2018/0022418 A1 * | 1/2018 | Pfeiffer | F16H 7/18 474/140 |
| 2018/0319459 A1 | 11/2018 | Staples | |
| 2019/0127023 A1 * | 5/2019 | Fujimoto | B62M 9/12 |

OTHER PUBLICATIONS

Chain Guide—ISCG05, [online], Retrieved from https://www.oneupcomponents.com/, OneUp Components, United States of America.

Chain Keeper, [online], Retrieved from https://www.paulcomp.com/, [2019], Paul Component Engineering, United States of America.

FSA Grid Chain Guide, [online], Retrieved from https://www.fullspeedahead.com/, [2019], Apr. 7, 2017, Full Speed Ahead, United States of America.

Cheap Chain Keeper, [online], Retrieved from htttps://getfireshot.com/, [2018], Bike Forums, MH Sub I, LLC dba Internet Brands, 2010, United States of America.

Bikeblogger, Paul Chain Keeper Catcher Guide Installation, [online], Retrieved from https://www.youtube.com/, Oct. 3, 2015, United States of America.

Weagle NPL_20131017 9, photo.

Weagle NPL_20131017 10, photo.

Weagle NPL_20131017 16, magazine, p. 138.

Weagle NPL_20131017 19, Chainguide, Race Face Performance Products, 2005.

Weagle NPL_20131017 21, Universal Chainguide System, brochure, Mountain Cycle Simply the Best, United States of America.

Weagle NPL_20131017 22, Universal Chainguide System, brochure, Mountain Cycle Simply the Best, United States of America.

Weagle NPL_20131017 23, Universal Chainguide System, brochure, Figures 1-8, Mountain Cycle Simply the Best, United States of America.

* cited by examiner

ROTATIONALLY-ENGAGING TWO-PIECE UPPER CHAIN GUIDE

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates to a chain guide for a bicycle. More specifically, the present design relates to a chain guide for use adjacent a front gear of a bicycle, where the chain guide is adjustable in multiple orientations, one of which is adjustable separately from the others, but along the same axis.

Bicycles come in many different shapes and sizes. Riders change their bicycles in a variety of ways so that the bicycles perform in the manner a rider desires. In some cases, the rider may select a particular frame size that fits them in a particular manner. They may select a particular handlebar or tire style, depending on whether they are doing road racing or off-road riding. They may select a particular suspension style, depending on the number and type of obstacles they may encounter.

In addition to these considerations, riders may wish to vary the chain rings that they use with their bicycles to better tune the torque they will require to properly ride in a particular location. A rider may want to select from a variety of chain rings and change them depending on what type of riding they plan to do. However, when a chain ring size is changed, that change may affect other features of the bicycle. In addition, a rider may want to minimize expense by using the same accessory equipment on different bicycles, including bicycles with different overall styles.

In some riding situations, it may be desirable to use a chain guide to minimize the risk of the chain becoming detached from the chain ring. It is conventional to use a chain guide in the area where the bicycle chain comes into contact with a front chain ring or chain ring set and also in the area where the bicycle chain moves away from contact with the front ring or ring set. It is also conventional to secure the chain guide or guides to a bracket or plate that is attached to the bicycle frame adjacent the front chain ring. An example of such devices may be found in U.S. Pat. No. 8,235,849.

However, it is common for a rider to change the chain rings used on a particular bicycle and to use different bicycle frames for riding. Different chain rings incorporated on different bicycle frames will cause the chain to enter and leave the front chain ring set at a variety of angles. The chain guide may be helpful in guiding the chain into proper engagement with the front chain ring and to exit the chain ring at an appropriate angle before returning to the rear chain ring set.

In some circumstances, a chain may become disengaged from the remainder of the drive train, such as the chain rings, while riding. This may occur for a variety of reasons, including contact with obstacles, the lodging of a small rock or mud in a series of chain cavities, rider foot misplacement, or several other reasons. In addition, other debris may become lodged in a chain ring and cause the riding to be negatively affected. When all the chain guides attached near a chain ring are fixed in place, it may be difficult for a rider to easily remove and/or reinstall the chain onto the chain rings and be on his or her way. If such a circumstance were to occur when the rider is near his or her vehicle or home, the rider could easily use tools to remove some of the chain guides, do any necessary cleaning or adjustments, replace the chain, and then use the tools to reinstall the chain guides. However, because these circumstances often occur when a rider is remote from such locations, tools to make these removals and adjustments are not readily available.

Accordingly, in many embodiments, it may be desirable to incorporate a structure into the chain guide assembly that allows the rider to adjust or remove some or all of the chain guide assembly without requiring the use of a tool. It may be desirable in some embodiments for a rider to be able to leave one portion of the guide assembly locked in place on the bicycle, so that the position and orientation of the chain guide assembly need not be adjusted after the rider makes the necessary cleaning, adjustments, or re-installation of the chain.

BRIEF SUMMARY OF THE INVENTION

The present invention is directed to an assembly for minimizing the disengagement of a chain from a chain ring.

The assembly may include an inboard leg, an outboard leg, a first mating portion on the inboard leg, and a second mating portion on the outboard leg. The first mating portion and the second mating portion may interfit with one another to connect the inboard leg to the outboard leg. The first mating portion and the second mating portion may be configured to engage with one another by rotating the outboard leg relative to the inboard leg.

The first mating portion may comprise a first projection. The second mating portion may comprise a second projection. At least one of the first mating portion and the second mating portion may include an angled portion. The angled portion may be capable of deforming another mating portion. The rotation of the outboard leg relative to the inboard leg may cause frictional engagement between the outboard leg and the inboard leg.

The assembly may further include a lock. The lock may be capable of further securing the inboard leg and the outboard leg to one another. The lock may comprise a clasp. The lock may comprise a fastener.

The assembly may further include a stop. The stop may include a finger on one of the inboard leg and the outboard leg that is capable of engaging the other of the inboard leg and the outboard leg.

The assembly may further include a shaft. Rotation of the outboard leg relative to the inboard leg may be capable of securing the inboard leg, the outboard leg, and the shaft relative to one another.

The assembly may further include a sleeve. The sleeve may at least partially surround the shaft. Rotation of the outboard leg relative to the inboard leg may be capable of securing the inboard leg, the outboard leg, the sleeve, and the shaft relative to one another.

In another embodiment, the assembly may include an inboard leg, an outboard leg, a first mating portion on the inboard leg, and a second mating portion on the outboard leg. The first mating portion and the second mating portion may interfit with one another to connect the inboard leg to the outboard leg. The outboard leg may be configured to rotate relative to the inboard leg. The interfitting of the first mating portion and the second mating portion may be capable of substantially securing the inboard leg to the outboard leg laterally.

The first mating portion may include a first projection. The second mating portion may include a second projection. At least one of the first mating portion and the second mating portion may include an angled portion. The angled portion may be capable of deforming another mating portion. Rotation of the outboard leg relative to the inboard leg may cause frictional engagement between the inboard leg and the outboard leg.

The assembly may further include a lock capable of further securing the inboard leg and the outboard leg to one another. The lock may include a clasp. The lock may include a fastener.

The assembly may further include a stop. The stop may include a finger on one of the inboard leg and the outboard leg that is capable of engaging at least one stop surface on the other of the inboard leg and the outboard leg. The at least one stop surface may comprise a recess on a face of the inboard leg. The finger may be positioned on the outboard leg adjacent the second mating portion. The finger may be positioned remote from the first mating portion and the second mating portion. The at least one stop surface may include a first stop surface and a second stop surface.

The assembly may further comprise a shaft. Rotation of the outboard leg relative to the inboard leg may be capable of securing the inboard leg, the outboard leg, and the shaft relative to one another.

The assembly may further include a sleeve at least substantially surrounding the shaft. Rotation of the outboard leg relative to the inboard leg may be capable of securing the inboard leg, the outboard leg, the sleeve, and the shaft relative to one another.

Figure 1:
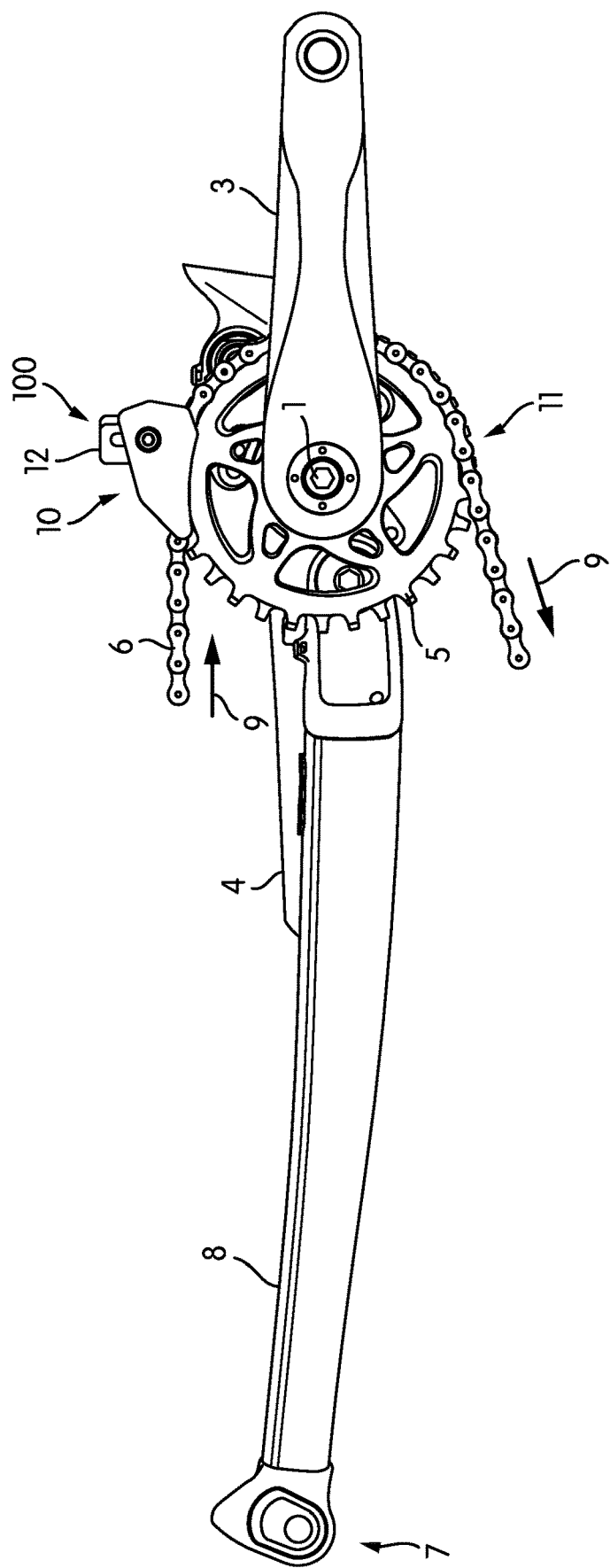
FIG. 1 is a side view of the assembly according to the disclosure, showing the relevant position of the assembly on a bicycle frame.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical center plane of the bicycle. In addition, the terms "bicycle" and "bike" are used herein interchangeably. A person having ordinary skill in the art will understand that if something is referred to as one, it can refer to the other.

The present device relates to an assembly for minimizing the risk of disengagement of a chain from a chain ring. The illustrations herein only partially show the bicycle structure. However, an ordinary designer will fully understand how the structures described herein may be incorporated into a bicycle.

Figure 2:
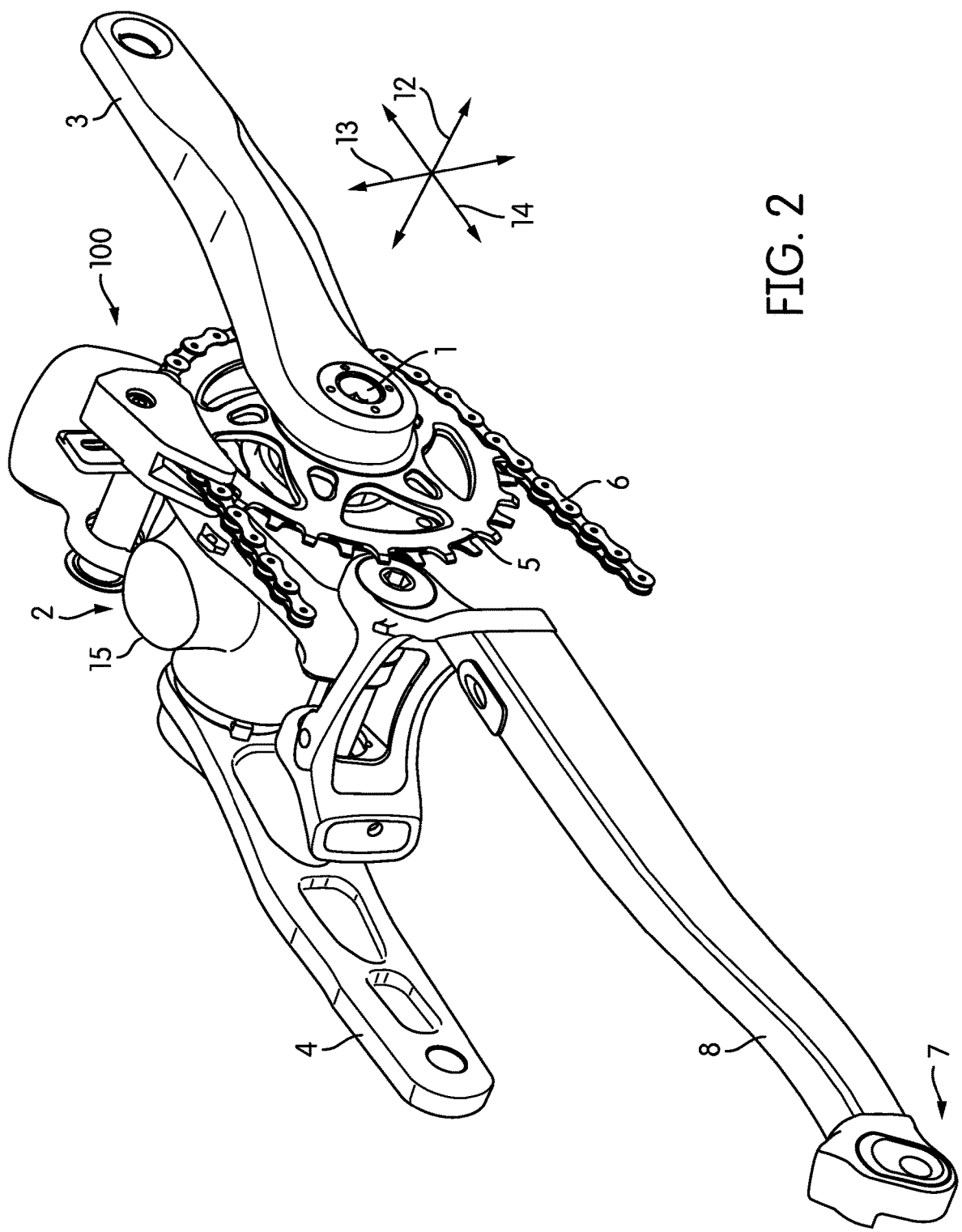
FIG. 2 is a perspective view of the assembly as shown in FIG. 1.
Figure 4:
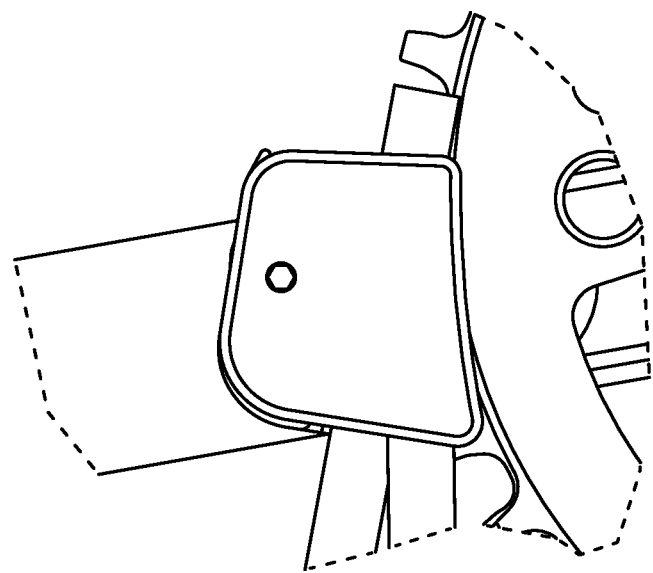
FIG. 4 is a closer side view of the embodiment of FIG. 3.
Figure 3:
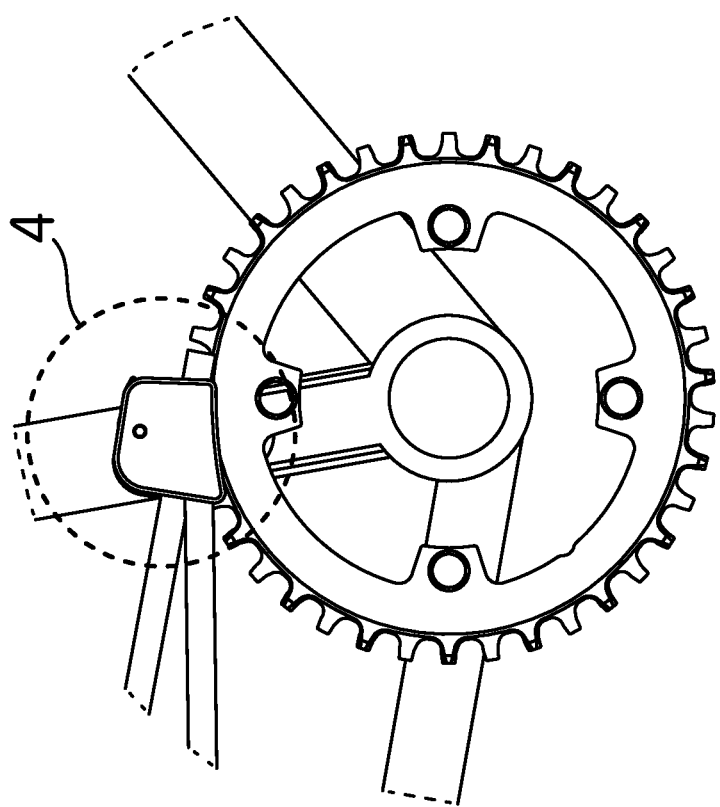
FIG. 3 is a side view of a first embodiment of the assembly without some of the drive train.
Figure 6:
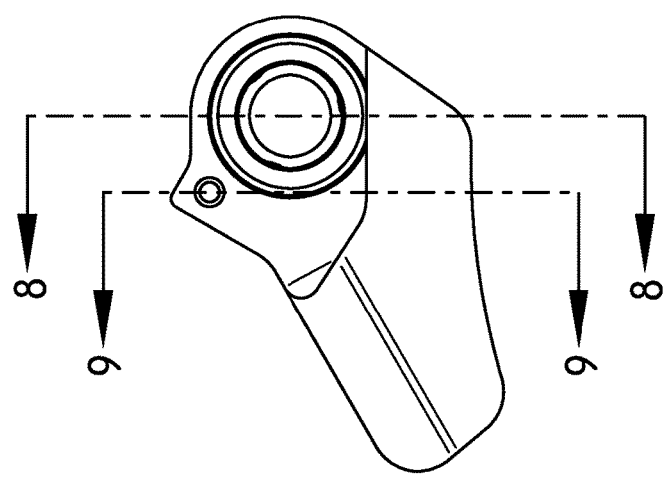
FIG. 6 is a front view of the inboard leg of FIG. 5.
Figure 9:
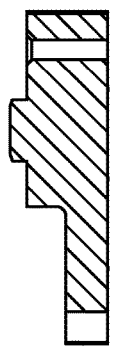
FIG. 9 is a cross-sectional view of the inboard leg of FIG. 5 taken along line 9-9 of FIG. 6.
Figure 8:
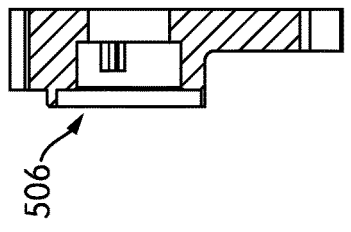
FIG. 8 is a cross-sectional view of the inboard leg of FIG. 5 taken along line 8-8 of FIG. 6.
Figure 5:
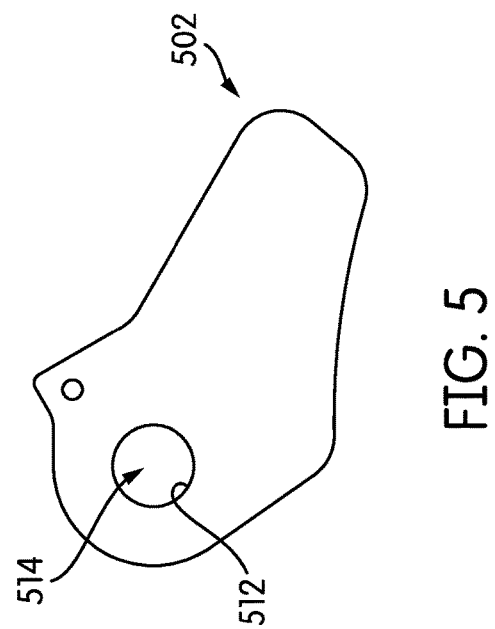
FIG. 5 is a back view of one embodiment of an inboard leg.
Figure 7:
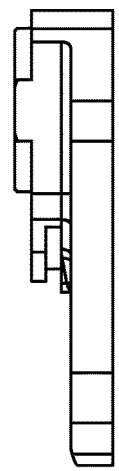
FIG. 7 is an end view of the inboard leg of FIG. 5.
Figure 11:
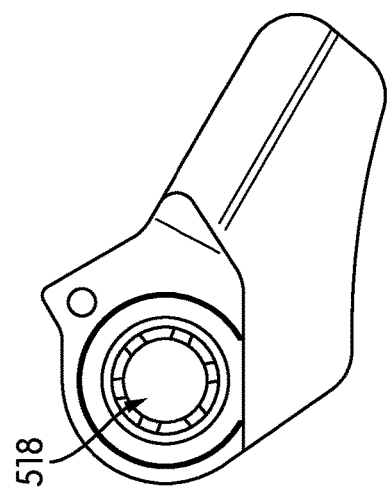
FIG. 11 is a back view of the outboard leg of FIG. 10.
Figure 14:
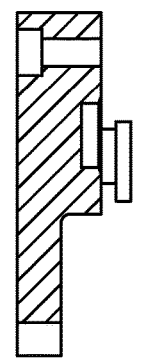
FIG. 14 is a cross-sectional view of the outboard leg of FIG. 10 taken along line 14-14 of FIG. 10.
Figure 13:
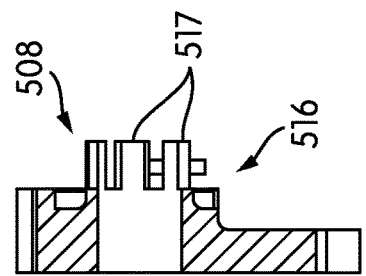
FIG. 13 is a cross-sectional view of the outboard leg of FIG. 10 taken along line 13-13 of FIG. 10.
Figure 10:
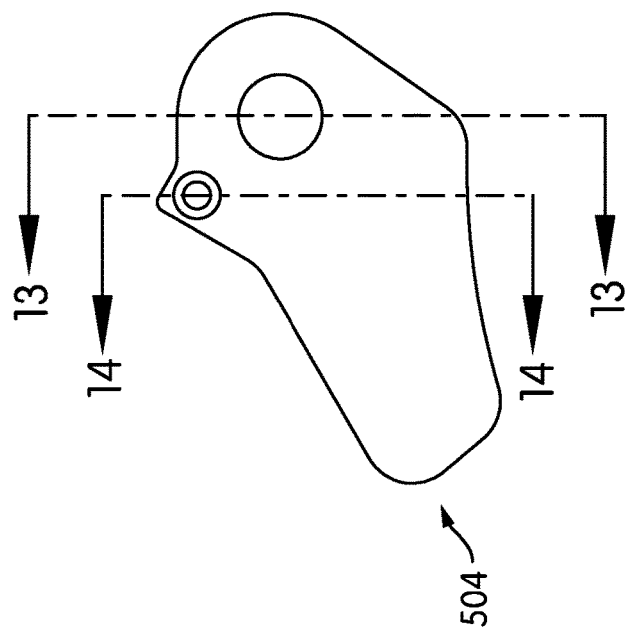
FIG. 10 is a front view of one embodiment of an outboard leg.
Figure 12:
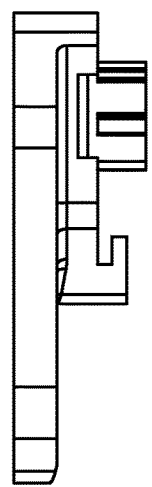
FIG. 12 is an end view of the outboard leg of FIG. 10.
Figure 15:
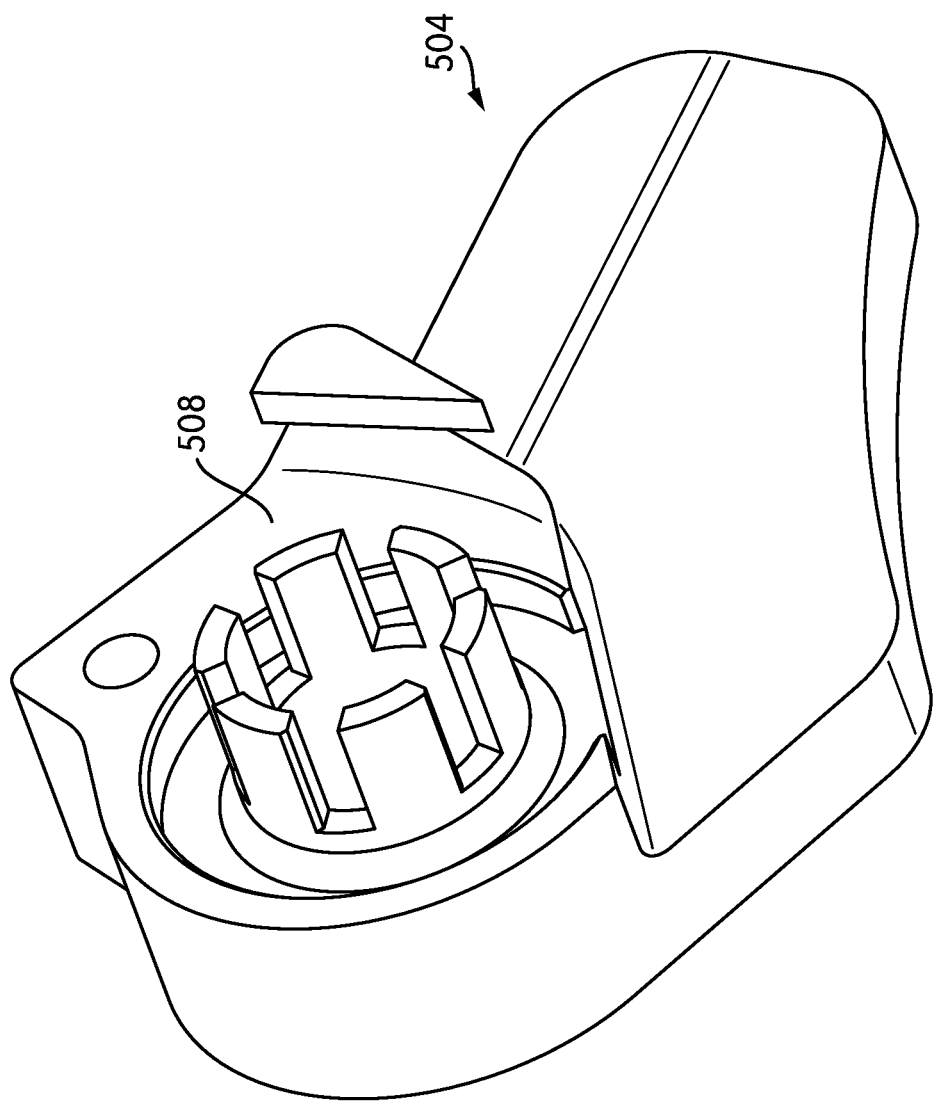
FIG. 15 is a perspective view of the outboard leg of FIG. 10.
Figure 16:
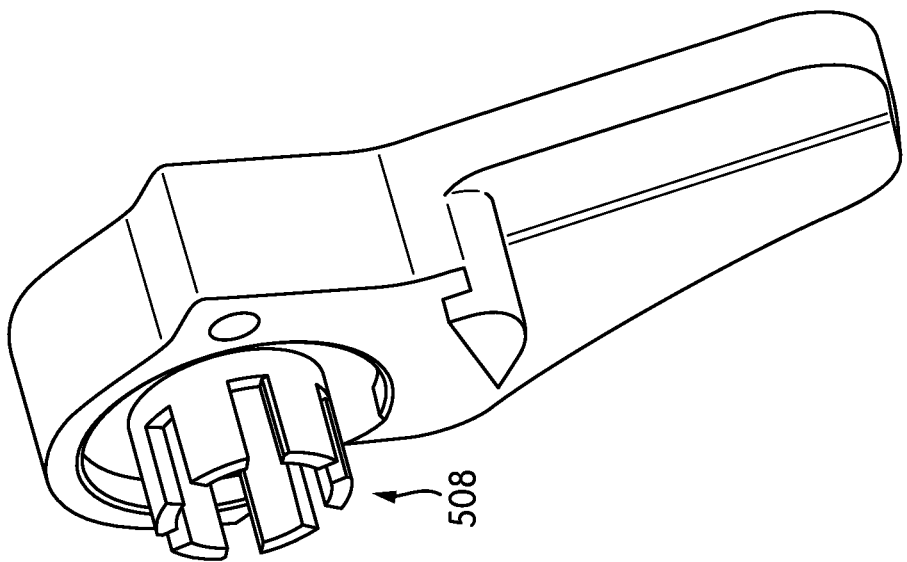
FIG. 16 is an exploded perspective view of the inboard and outboard legs of FIGS. 5 and 10 aligned with one another.
Figure 16:
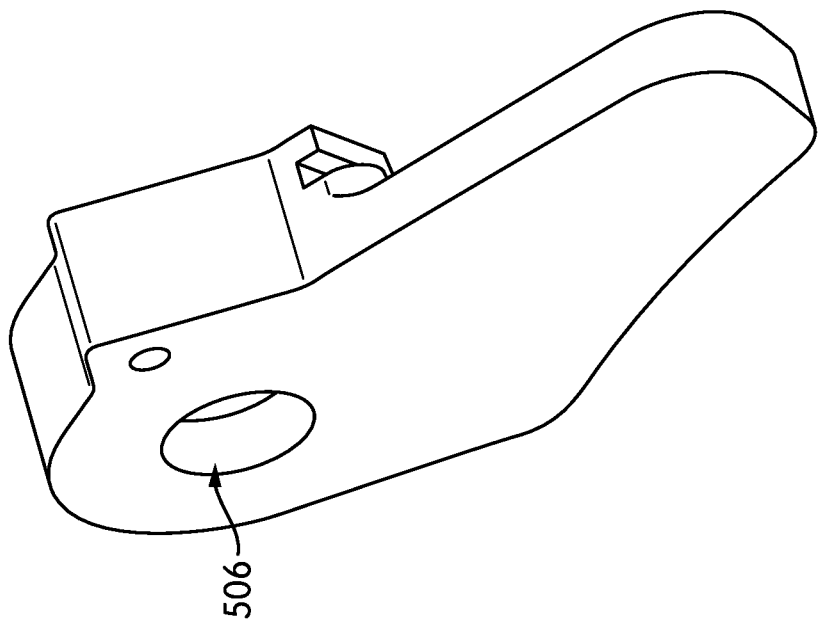

Turning to FIGS. 1 and 2, when a rider rides a bicycle, the rider presses their feet in a rotational manner on pedals (not shown) attached to a crank shaft 1. The crank shaft may extend through a bottom bracket 2 of a bicycle frame 15 and may maintain the pedals and the arms 3, 4 attached between the pedals and the crank shaft 1 in an opposite orientation, where they are around 180 degrees apart, as shown. One or more chain rings 5 may be mounted on or adjacent the crank shaft 1. A chain 6 may engage the chain ring 5 and may also engage additional, rear chain rings or the cassette (not shown), which are conventionally mounted at a location at the rear end 7 of an arm 8. When the rider uses the pedals and thereby rotates the chain ring 5, the chain 6 may move into and out of engagement with the chain ring 5 and a gear on the cassette. When the bicycle is in use, in typical circumstances, the rider may move the pedals and the arms 3, 4 in a clockwise direction, and the chain 6 may move in the direction of the arrows 9, although many bicycles may allow a rider to pedal in a counterclockwise direction. In most conventional bicycles for adults, a conventional ratchet system (not shown) may be incorporated into the bicycle to disengage the drive force of the drive chain 6 from the rear shaft and wheel (not shown) whenever the pedals are moved in a direction other than clockwise, for example, when coasting. A rider may use a variety of different bicycles and may install a variety of sizes of chain rings 5 in the location shown and in the cassette at the rear location 7. Indeed, riders may select a single front ring 5 or a series of front rings 5 installed adjacent one another in a conventional manner and may select between any number of gears that are installed in the cassette in the rear area 7. Many riders may select two front gears and five rear gears (a "ten speed"), three front gears and seven rear gears (a "twenty-one speed"), or another combination. The choice of the number and size of each ring can be individually selected by the rider to support the type of riding the rider wishes to do and the amount of torque the rider is interested in using to ride. Because of this variability in the number and size of rings and the size of different types of bicycle frames 15, there is a variability in the lateral and vertical angle at which the chain 6 engages the chain ring 5 in the engagement area 10 and in the lateral and vertical angle at which the chain 6 exits the chain ring 5 in the disengagement area 11. Looking at FIG. 3, simple straight lines have been used tangential to the arc of the chainring to represent the spatial envelope occupied by the chain, these lines show two different positions of the chain corresponding to its engagement with different rear wheel cogs (not shown) of the bicycle.

Among the risks in riding a bicycle is the risk of the chain 6 becoming disengaged from the drive system (chain ring 5 and the rear cassette). While it is inconvenient when a chain falls off when a rider is riding on a neighborhood path near their house, it can be dangerous when a rider is riding in an untraveled area on a mountain or wilderness area. While a rider may deliberately select drive gears so that the risk of chain disengagement due to the relative angles of the chain is reduced, not all variables can be controlled. Sticks and rocks and other items in the environment may contact the chain while the rider is riding and also affect the angle of the chain. Accordingly, many riders may choose to incorporate a guide to help position the chain 6 as it enters the engagement area 10 or leaves the disengagement area 11 to minimize the risk of disengagement.

In the present illustration, the assembly 100 to be described and claimed in further detail herein (along with other embodiments of the assembly with other numbers) is shown as being generally in the engagement area 10 of the front chain ring 5. In other embodiments, a functional equivalent of the assembly could be positioned in the disengagement area 11 of the front chain ring 5. In other embodiments, the assembly could be positioned in the engagement or disengagement areas of the rear cassette. A typical designer will be able to adjust the precise configuration of the assembly 100 to work in one of the other locations. As noted above, the chain 6 can be moved in the opposite direction from the direction 9, and accordingly, the disengagement area 11 can become an engagement area 10 when the arms 3, 4 are rotated counterclockwise.

In the illustrated embodiments, the disclosure may refer to a first or inboard leg and a second or outboard leg. The inboard leg and the outboard leg in each embodiment may have different features from one another. It will be apparent to one of ordinary skill in the art that features shown as being on an inboard leg may instead be incorporated into an outboard leg and that a corresponding inboard leg could then incorporate the features of the leg described herein as an outboard leg. Further, while the inboard leg and outboard leg are shown as having particular overall shapes or profiles, the particular shape of a leg may be selected by a designer for a variety of functional and aesthetic reasons, and the shape of the inboard leg and outboard leg are not specifically relevant to the functional features described herein. Further, while the described embodiments are shown as having an inboard leg and an outboard leg that have similar shapes and sizes, this feature is also not critical to the function and other features of the assembly. A person having ordinary skill in the art may make a variety of changes relating to the shape and size of the legs in known ways without affecting the function of the embodiments described herein.

Figure 17:
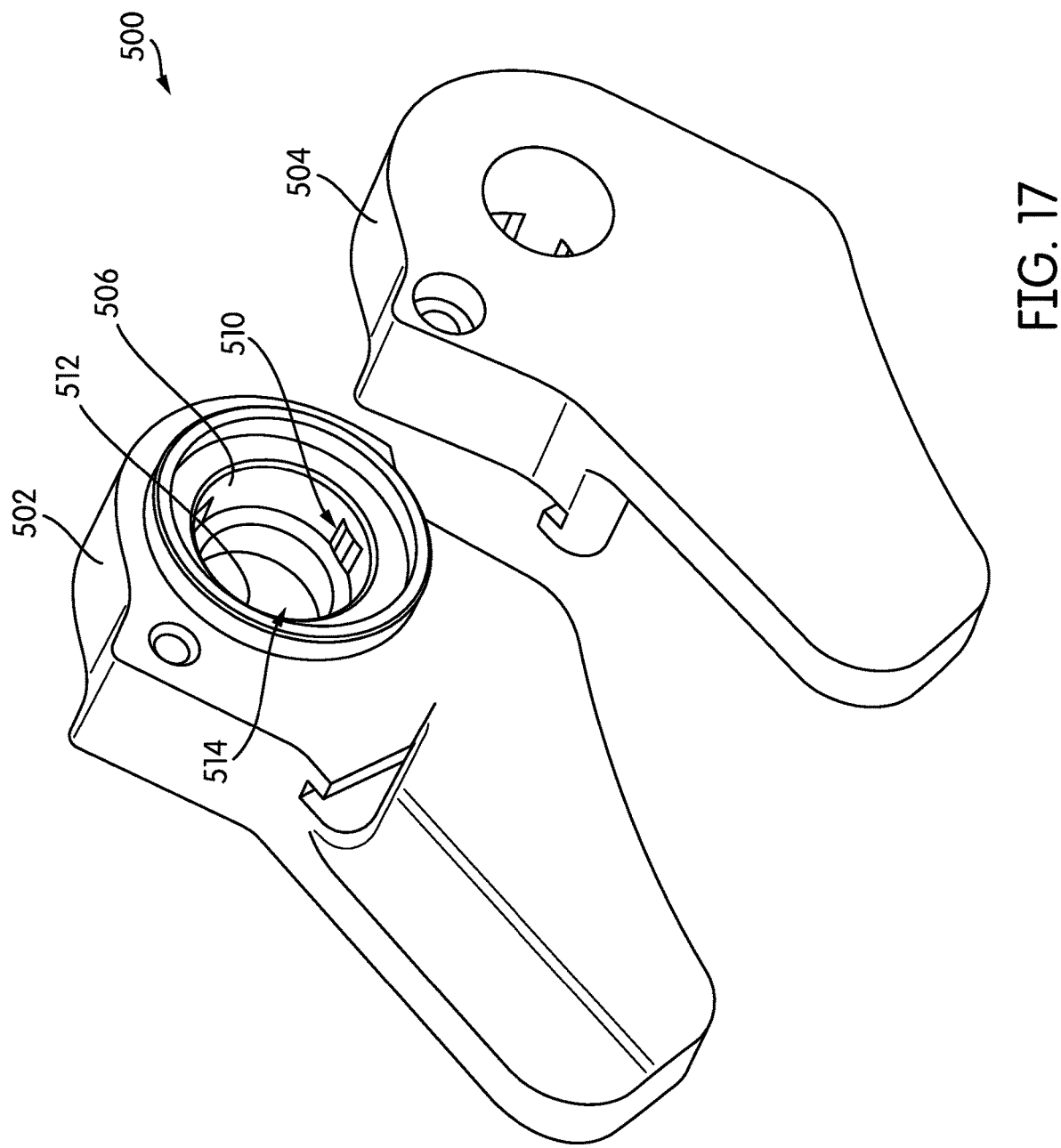
FIG. 17 is another exploded perspective view of the inboard and outboard legs of FIGS. 5 and 10 aligned with one another.

A first embodiment is illustrated in FIGS. 5-17. The chain guide assembly 500 may include a first or inboard leg 502 and a second or outboard leg 504. The inboard leg 502 may include a first mating portion 506. The first mating portion 506 may be a first projection 510, which may be the angled portion or ramp 510 (that may be best seen in FIG. 17) on an interior surface 512 defining a cavity 514 that may pass through the inboard leg 502 and allow passage of a fastener (not shown) to secure the assembly 500 to a bracket (such as the bracket 12 of FIG. 1) or other conventional structure that may secure the assembly to the frame of the bicycle.

The outboard leg 504 may include a second mating portion 508. The second mating portion 508 may include at least a second projection 516. In some embodiments, such as the one illustrated in FIGS. 5-17, the second projection 516 may include at least one or a plurality of fingers 517 that may project outwardly from the surface of the outboard leg 504 adjacent to a cavity 518 through which the fastener (not shown) may pass to secure the assembly to the bracket 12 or similar structure.

Figure 18:
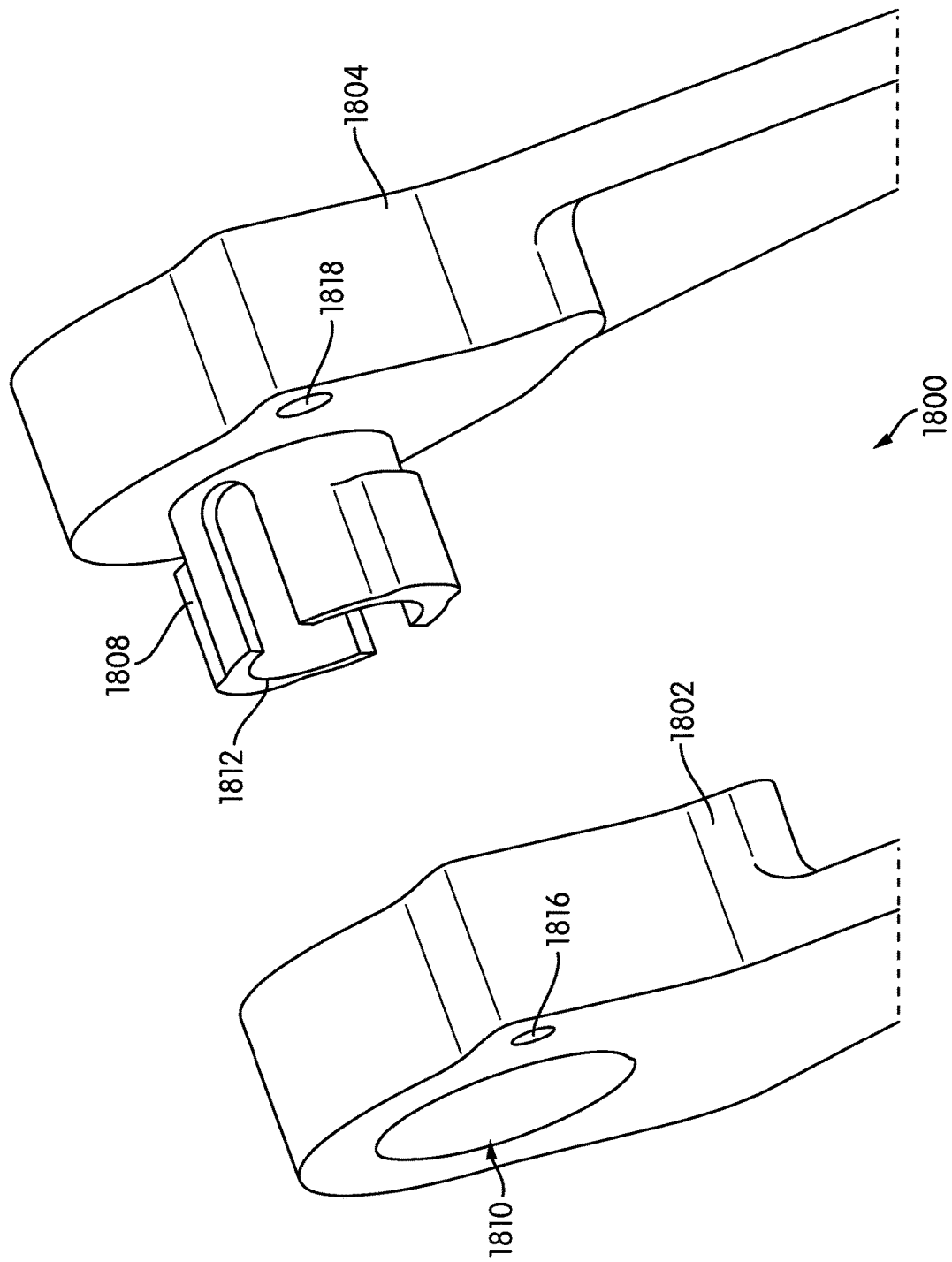
FIG. 18 is an exploded perspective view of another embodiment of inboard and outboard legs.
Figure 19:
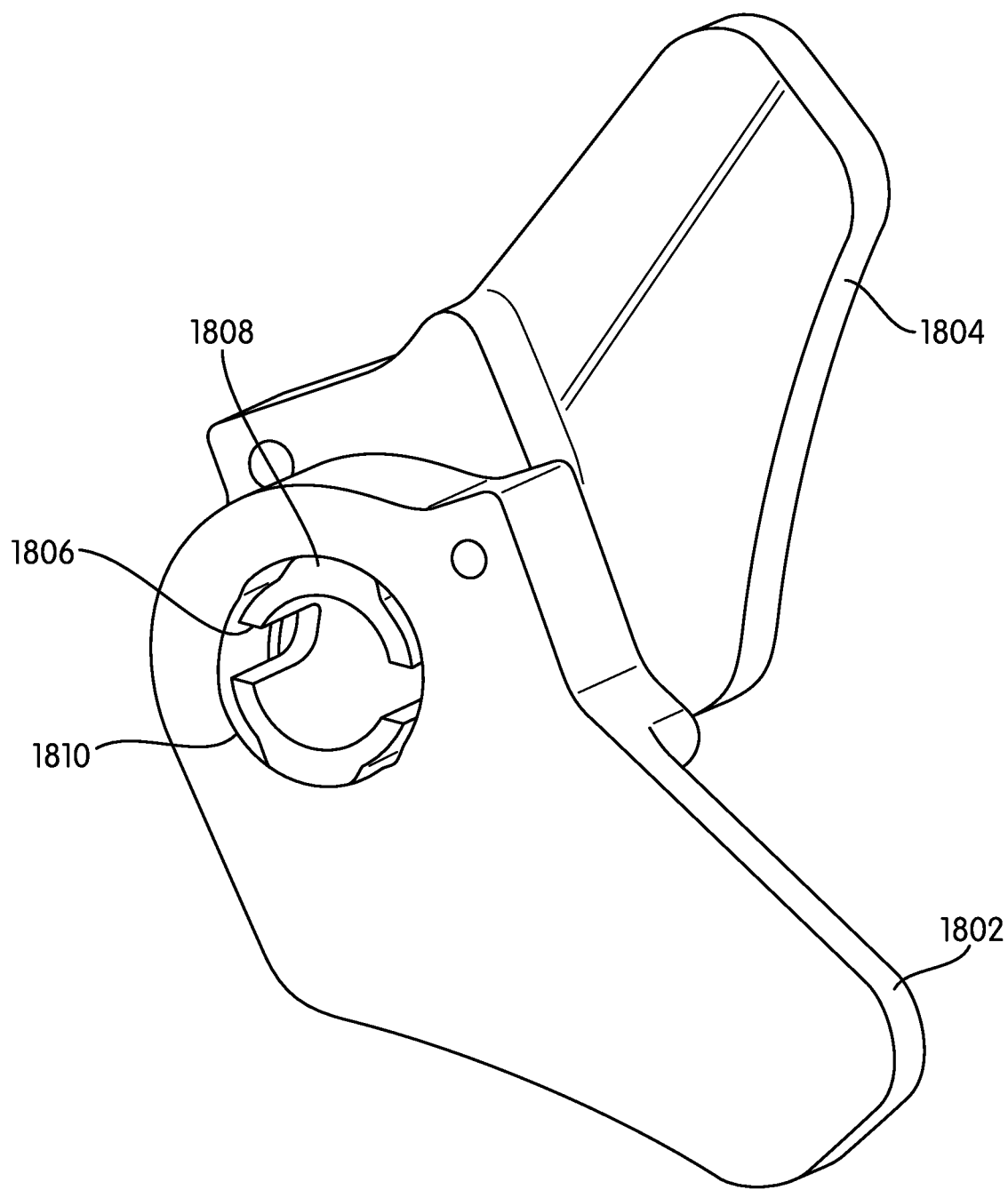
FIG. 19 is a perspective view of the inboard and outboard legs of FIG. 18 assembled together before rotation.
Figure 20:
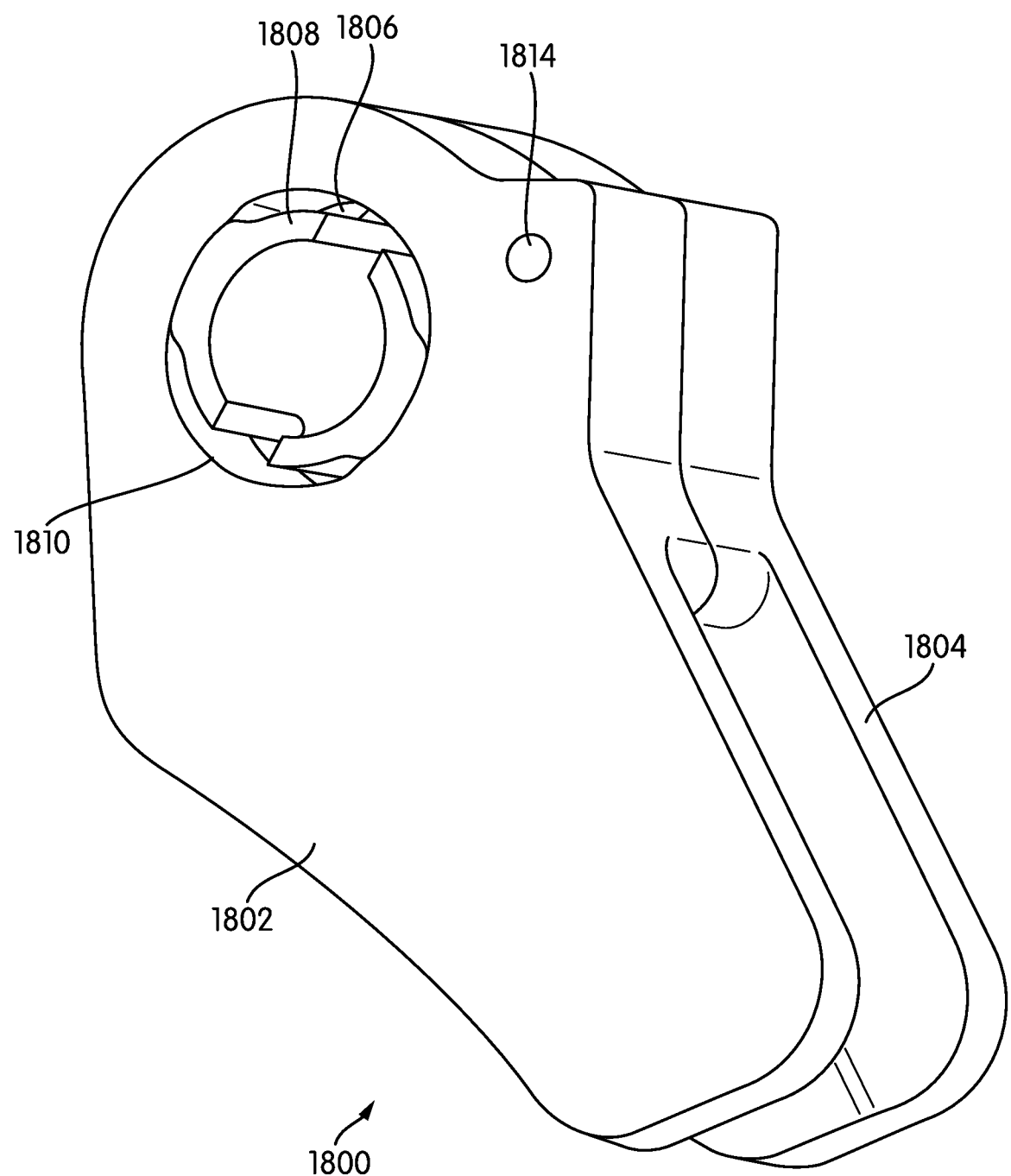
FIG. 20 is a perspective view of the inboard and outboard legs of FIG. 18 assembled together after rotation.

The interrelationship of the inboard leg and the outboard leg may be best seen in the embodiment of FIGS. 18-20. The embodiment of FIGS. 18-20 may include an inboard leg 1802 and an outboard leg 1804. The inboard leg 1802 may include a first mating portion 1806 that may be a first projection and may be a ramp portion within a first passageway 1810. The outboard leg 1804 may include a second mating portion 1808 that may be a second projection and include one or more fingers 1812. A view of the structures prior to assembly may be seen in FIG. 18.

To assemble the assembly 1800, the second mating portion 1808 on the outboard leg 1804 may be inserted into the first passageway 1810 in the inboard leg 1802 adjacent the first mating portion 1806. This position is shown in FIG. 19. The outboard leg 1804 may then be rotated relative to the inboard leg 1802 to the position shown in FIG. 20. In the position of FIG. 20, the ramp portions of the first mating portion 1806 may contact the fingers of, and thereby frictionally engage, the second mating portion 1808. In particular the second mating portion 1808 may be deformed as shown in FIG. 20. This deformation may secure the inboard leg 1802 and the outboard leg 1804 to one another. In an assembled condition, the deformed second mating portion 1808 may contact a conventional shaft (not shown) that passes through the first passageway 1810 within the first mating portion 1806 and the second mating portion 1808. In such a configuration, the rotation of the outboard leg 1804 relative to the inboard leg 1802 may substantially secure the inboard leg, the outboard leg and the shaft to one another rotationally and laterally.

In many embodiments, it may be desirable to incorporate a lock into the assembly to further secure the inboard leg 1802 to the outboard leg 1804. In the illustrated embodiment, a fastener 1814 may be inserted through an aperture 1816 in the inboard leg 1802 and an aperture 1818 in the outboard leg 1804. The fastener 1814 may be a screw or bolt or any other fastener that a designer may determine has a desirable shape, length, strength and other properties to further secure the inboard leg 1802 and the outboard leg 1804 to one another.

In some embodiments, it may be desirable to incorporate a sleeve into the assembly between the shaft and the mating portions. A sleeve may desirably be used when, for example, there is a risk of damage to the shaft from direct pressure from the mating portions. A sleeve interposed between the mating portions and the shaft may distribute the pressure from the mating portions more evenly around the circumference of the shaft and may offer different frictional characteristics in the anti-rotational aspect of the mating of the guide and shaft.

Figure 21:
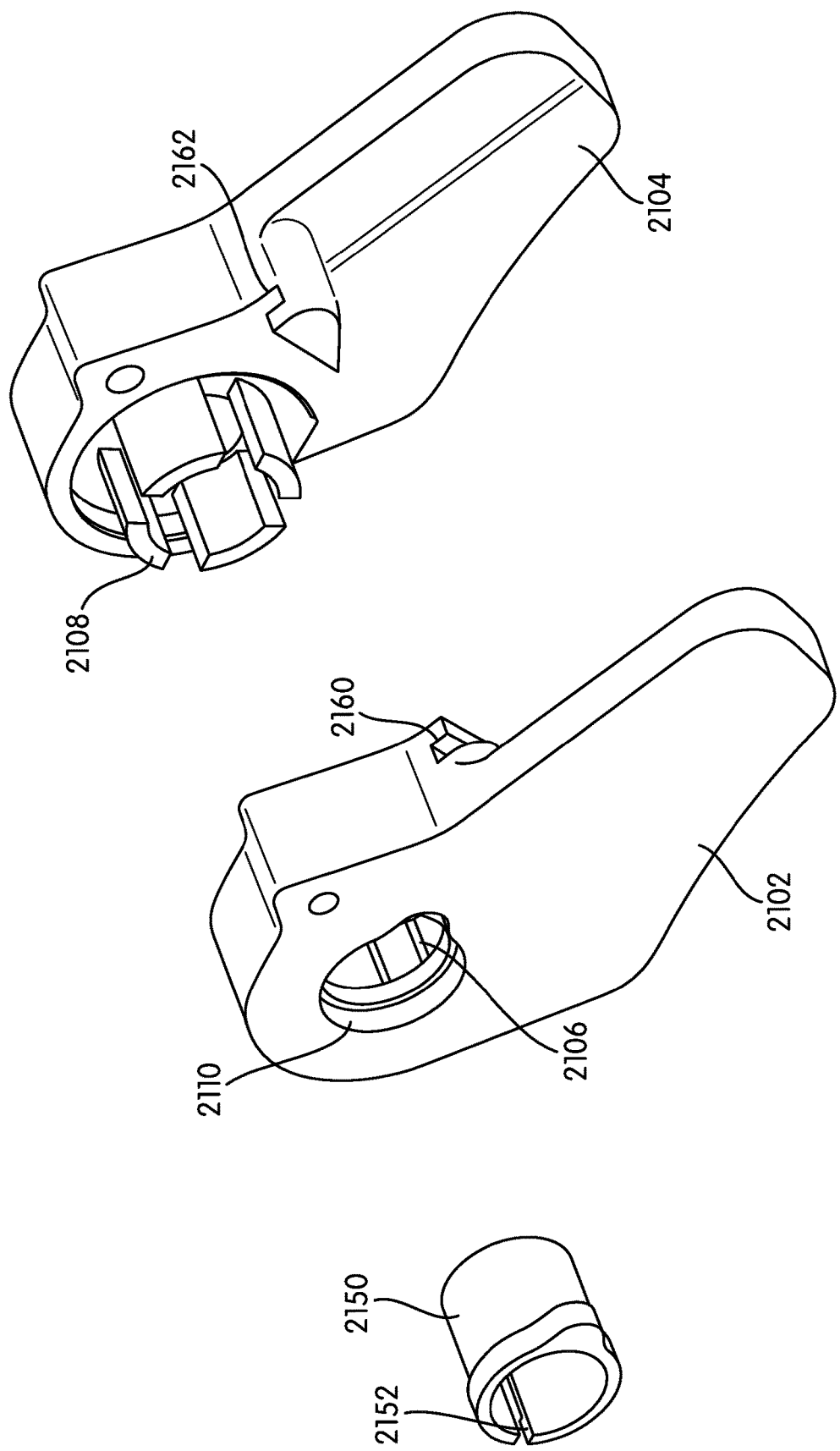
FIG. 21 is an exploded perspective view of another embodiment of inboard and outboard legs and including a sleeve.
Figure 22:
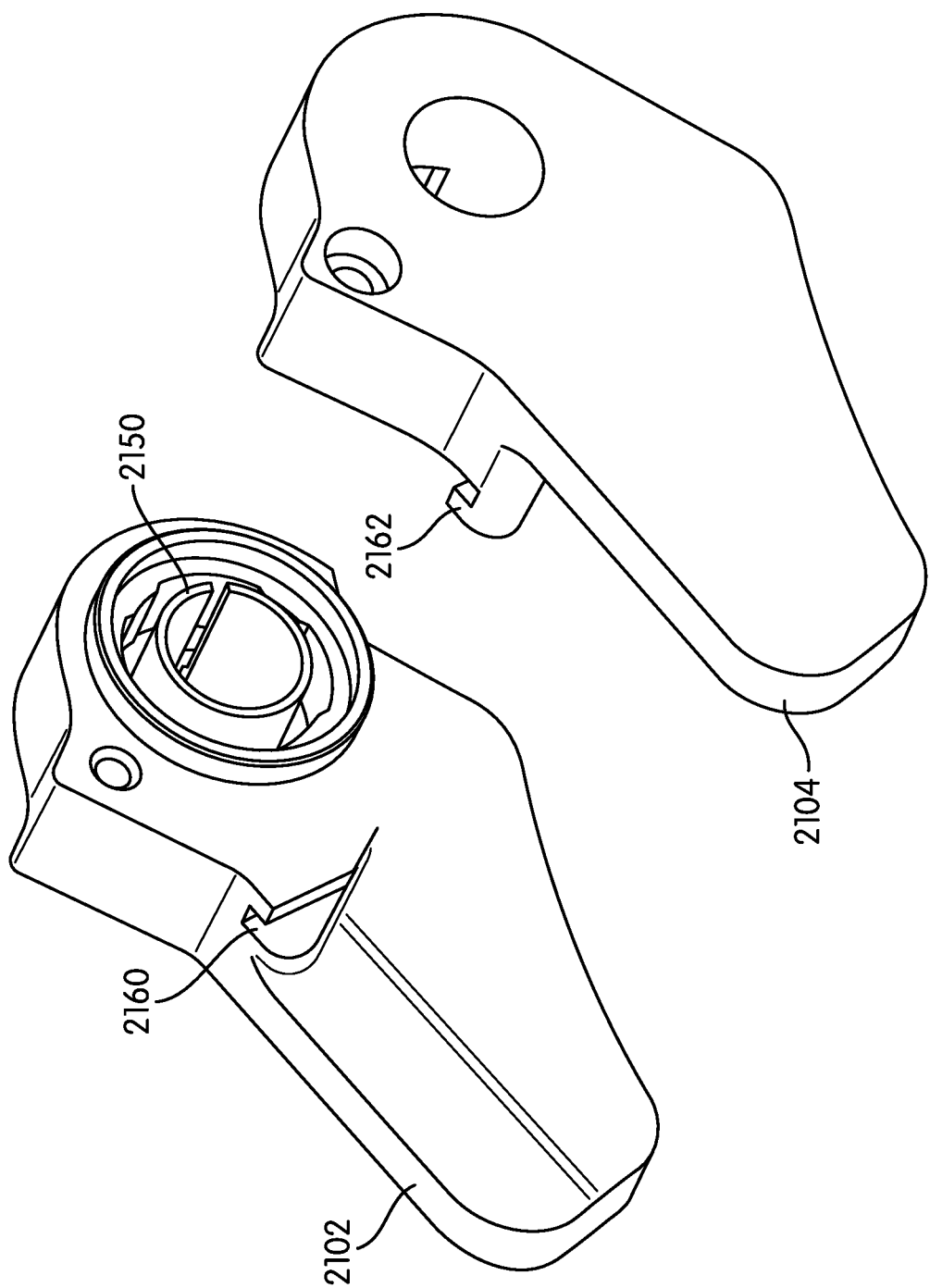
FIG. 22 is a partially exploded perspective view of the embodiment of FIG. 21.

One example of a structure using a sleeve is shown in FIGS. 21 and 22. The structure of the inboard leg 2102 is substantially the same as the inboard leg 502 described above. The structure of the outboard leg 2104 is substantially the same as the outboard leg 504 described above. However, in the embodiment of FIGS. 21 and 22, a sleeve 2150 is inserted into the aperture 2110 in the inboard leg and rotationally fixed to at least one of the inboard or outboard legs. The sleeve 2150 may be interposed between the second mating portion 2108 and the shaft (not shown). When the inboard leg 2102 is rotated into an engaged position, it may compress the sleeve 2150. The sleeve 2150 may include a slit 2152. When the outboard leg is rotated into position, and the first mating portion 2106 may press against and may deform the second mating portion 2108, the second mating portion 2108 may further press against the sleeve 2150. When the second mating portion presses against the sleeve 2150, the sleeve may compress and may reduce in effective diameter, creating a frictional engagement with the shaft (not shown). Accordingly, the relative rotation of the inboard leg 2102 and the outboard leg 2104 may cause the inboard leg 2012, the outboard leg 2104, the sleeve 2150 and the shaft to be substantially secured to one another.

Another feature that may be seen in the embodiment of FIGS. 21 and 22 is a stop. The stop may be formed from a first finger 2160 on the inboard leg 2102 and a second finger 2162 on the outboard leg 2104. When the inboard leg 2102 and the outboard leg 2104 are rotated and moved into engagement, the first finger 2160 and the second finger 2162 may interlock with one another. When one of the fingers 2160, 2162 comes into contact with a corresponding structure defining a recess on the other leg, the relative rotation of the legs may be stopped. The use of a stop similar to this design can provide a tactile assist to a user to ensure that the inboard and outboard legs are appropriately aligned with one another.

The stop need not be as complicated as that illustrated. The stop could instead be a finger extending along a top surface of the outboard leg or the bottom surface of the inboard leg, for example. Or a finger could be included within the aperture in the inboard leg. In some embodiments, the stop could be a removable part that snaps on one of the legs. Any designer can configure a stop having an appropriate configuration based on the designer's aesthetic and functional needs.

Figure 23:
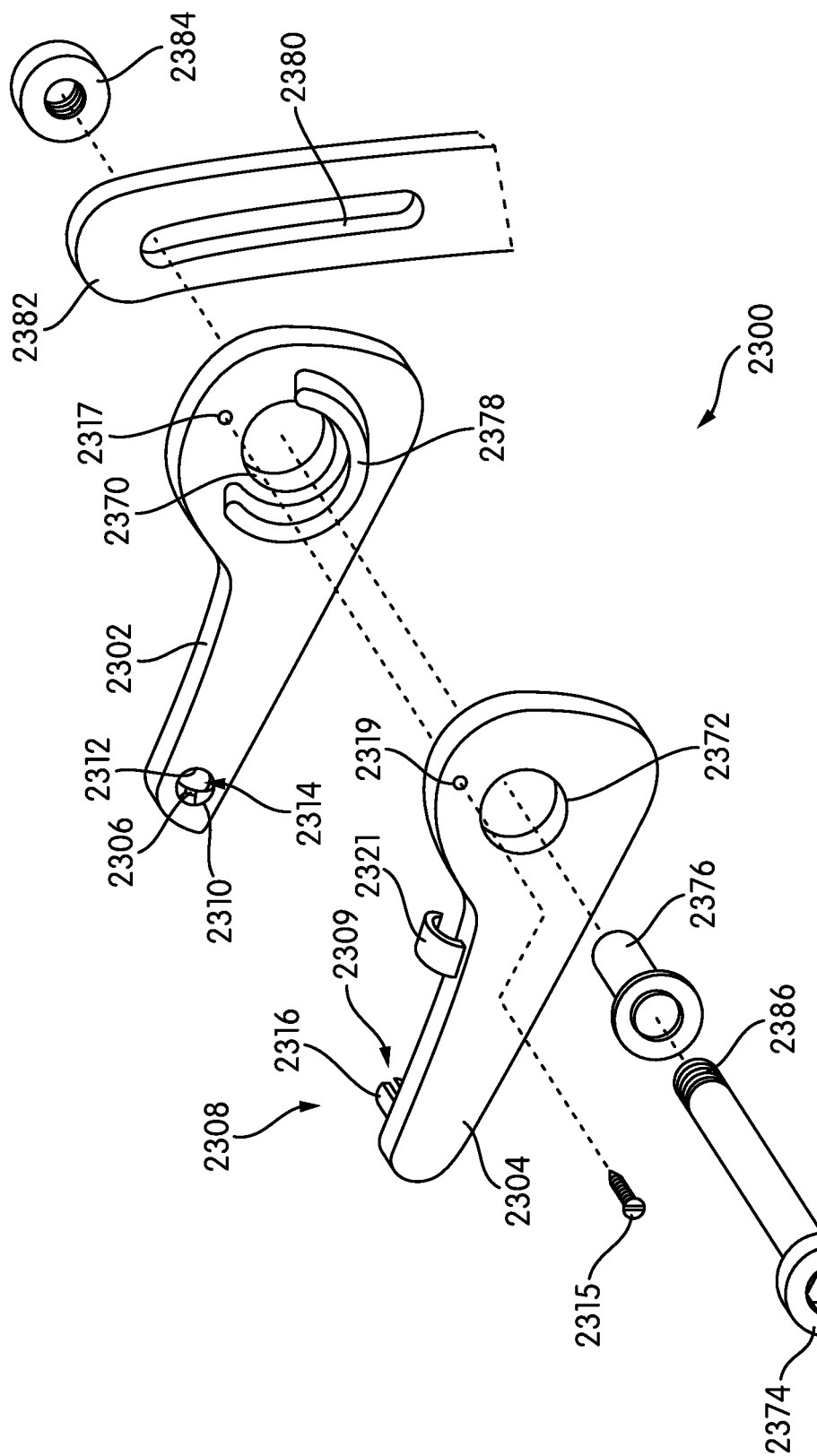
FIG. 23 is an exploded view of an alternative embodiment, where the first locking portion and the second locking portion are located remote from the shaft.
Figure 24:
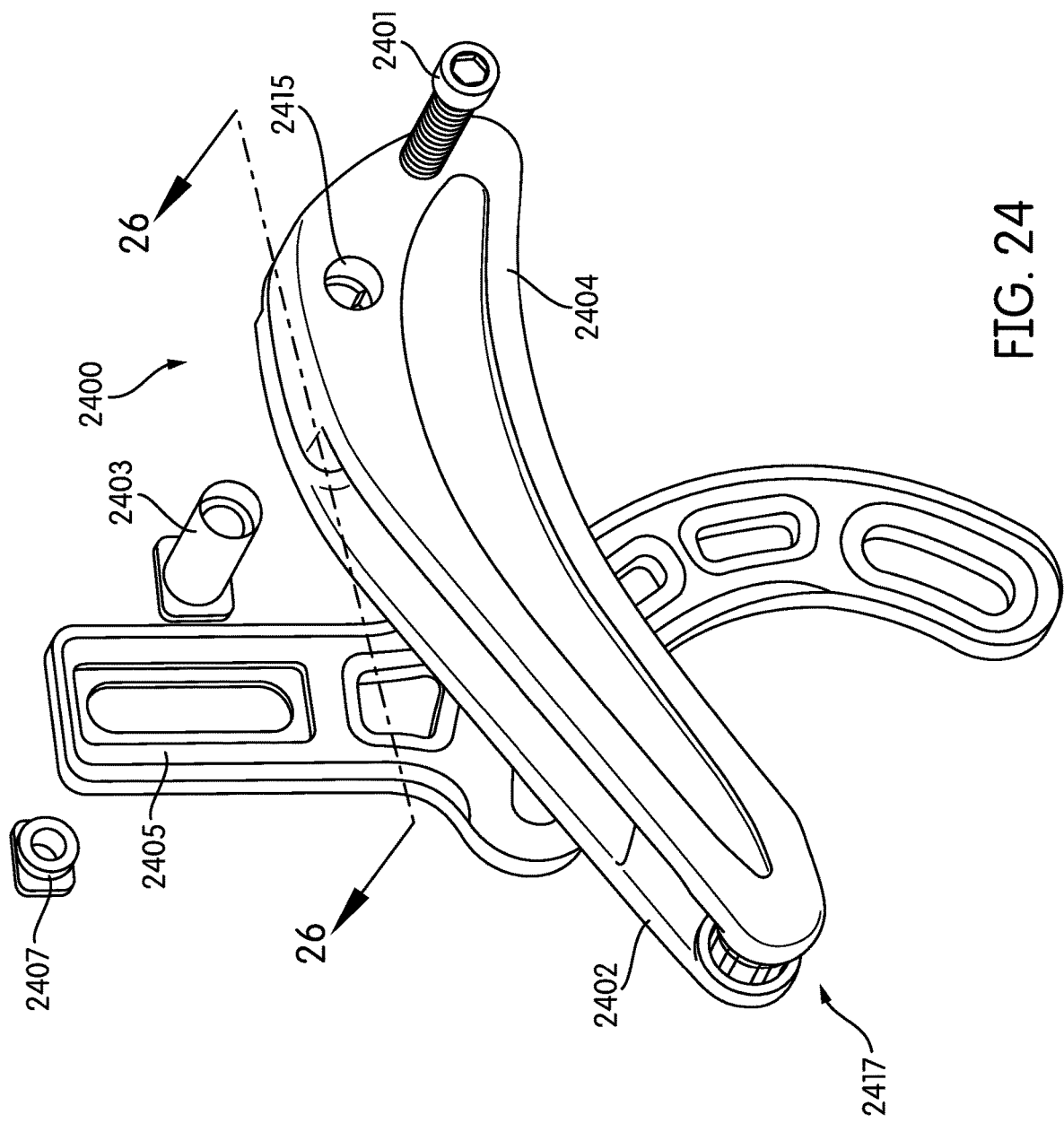
FIG. 24 is an exploded view of another alternative embodiment where the axis of rotation is located remote from the shaft.

The embodiments described thus far have located the mating portions adjacent the aperture in the inboard and outboard legs where the shaft is ordinarily positioned. However, in some embodiments, the mating portions may be positioned remote from that aperture. The embodiment shown in FIG. 23 illustrates such an embodiment.

The chain guide assembly 2300 may include a first or inboard leg 2302 and a second or outboard leg 2304. The inboard leg 2302 may include a first mating portion 2306. The first mating portion 2306 may be a first projection 2310, which may be the angled portion or ramp 2310 on an interior surface 2312 defining a cavity 2314 that may pass through the inboard leg 2302.

The outboard leg 2304 may include a second mating portion 2308. The second mating portion 2308 may include at least a second projection 2309. In some embodiments, such as the one illustrated in FIG. 23, the second projection 2309 may include at least one or a plurality of fingers 2316 that may project outwardly from the surface of the outboard leg 2304.

The inboard leg 2302 may include a first shaft aperture 2370 and the outboard leg 2304 may include a second shaft aperture 2372. A first finger 2378 may be positioned on the inboard leg 2302, and a corresponding second finger (not shown) may be positioned on the outboard leg 2304. When the outboard leg 2304 is rotated relative to the inboard leg 2302, the first mating portion 2306 and the second mating portion 2308 may create an interference fit and continue rotating until the first finger 2378 and the second finger come into contact with one another as a stop. An optional sleeve 2376 may be placed within the shaft apertures 2370 and 2372. A shaft 2374 may be inserted through the optional sleeve 2376, and the shaft apertures 2370 and 2372. The shaft 2374 may also pass through a shaft aperture 2380 in a bracket 2382, which may be further secured to a bicycle (not shown). A nut 2384 may be threaded onto a threaded end 2386 of the shaft to secure the shaft in place.

If desired, the inboard leg 2302 and the outboard leg 2304 may be further secured together with a lock. A fastener 2315 may be tightened into place through the appropriate apertures 2317 and 2319. Alternatively, another lock, such as the clip 2321 illustrated can be used.

Another alternative embodiment is illustrated in FIGS. 24-28. The chain guide assembly 2400 may include a first or inboard leg 2402 and a second or outboard leg 2404. The inboard leg 2402 may include a first mating portion 2406. The first mating portion 2406 may be a first projection 2410, which may include at least one or a plurality of fingers 2416 that may project outwardly from the surface of the inboard leg 2402 adjacent to a cavity 2418 through which the fastener 2401 and optional sleeve 2403 may pass to secure the assembly to the bracket 2405 using a nut 2407.

The outboard leg 2404 may include a second mating portion 2408. The second mating portion 2408 may include at least a second projection 2412. In some embodiments, such as the one illustrated in FIGS. 24-28, the second projection 2412 may include at least one or a plurality of fingers 2413 that may project outwardly from the surface of the outboard leg 2404 adjacent to a cavity 2415 through which the fastener 2401 and optional sleeve 2403 may pass to secure the assembly to the bracket 2405.

Figure 25:
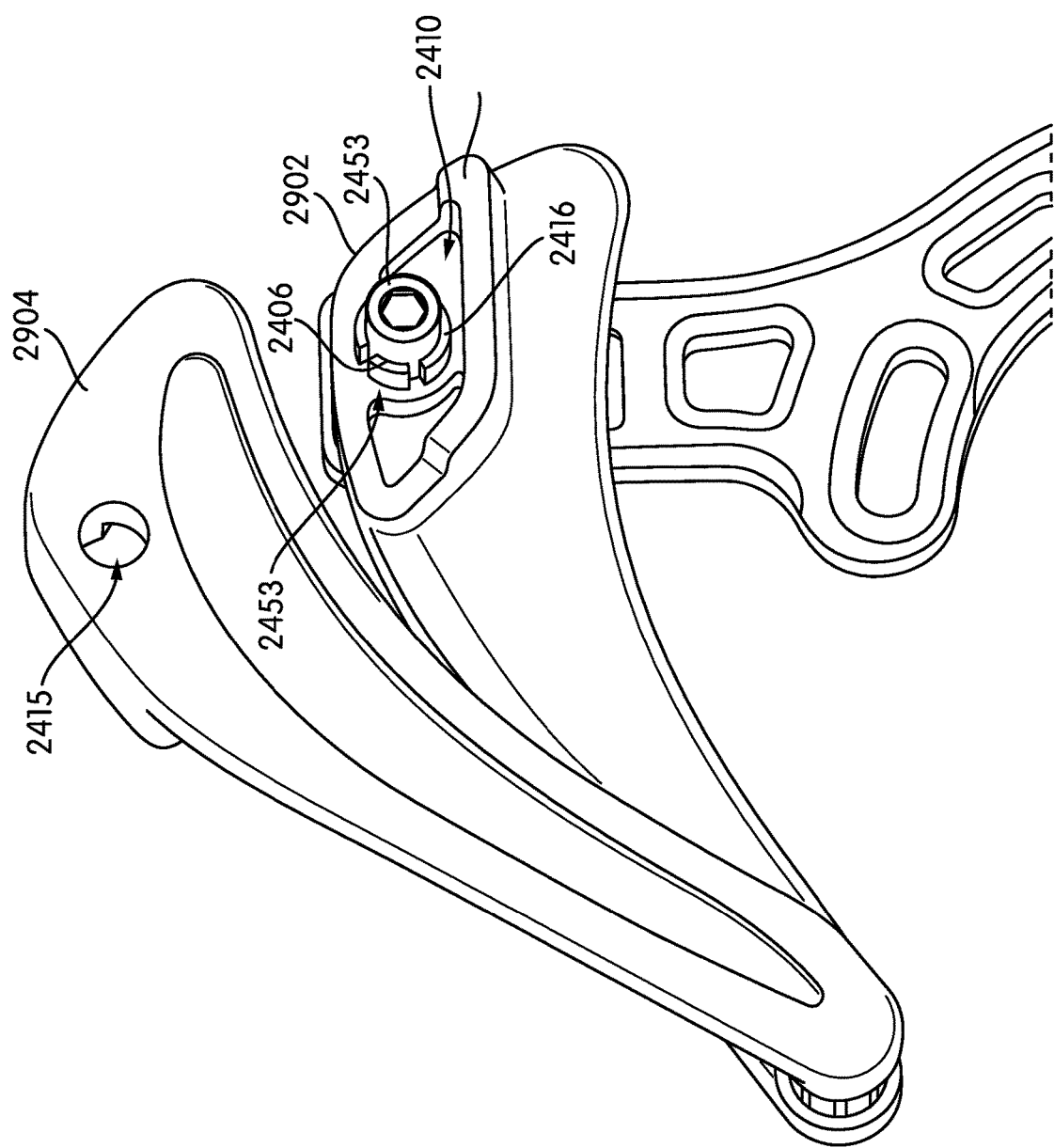
FIG. 25 is a perspective view of the embodiment of FIG. 24 and including a sleeve having a round cross-section.
Figure 26:
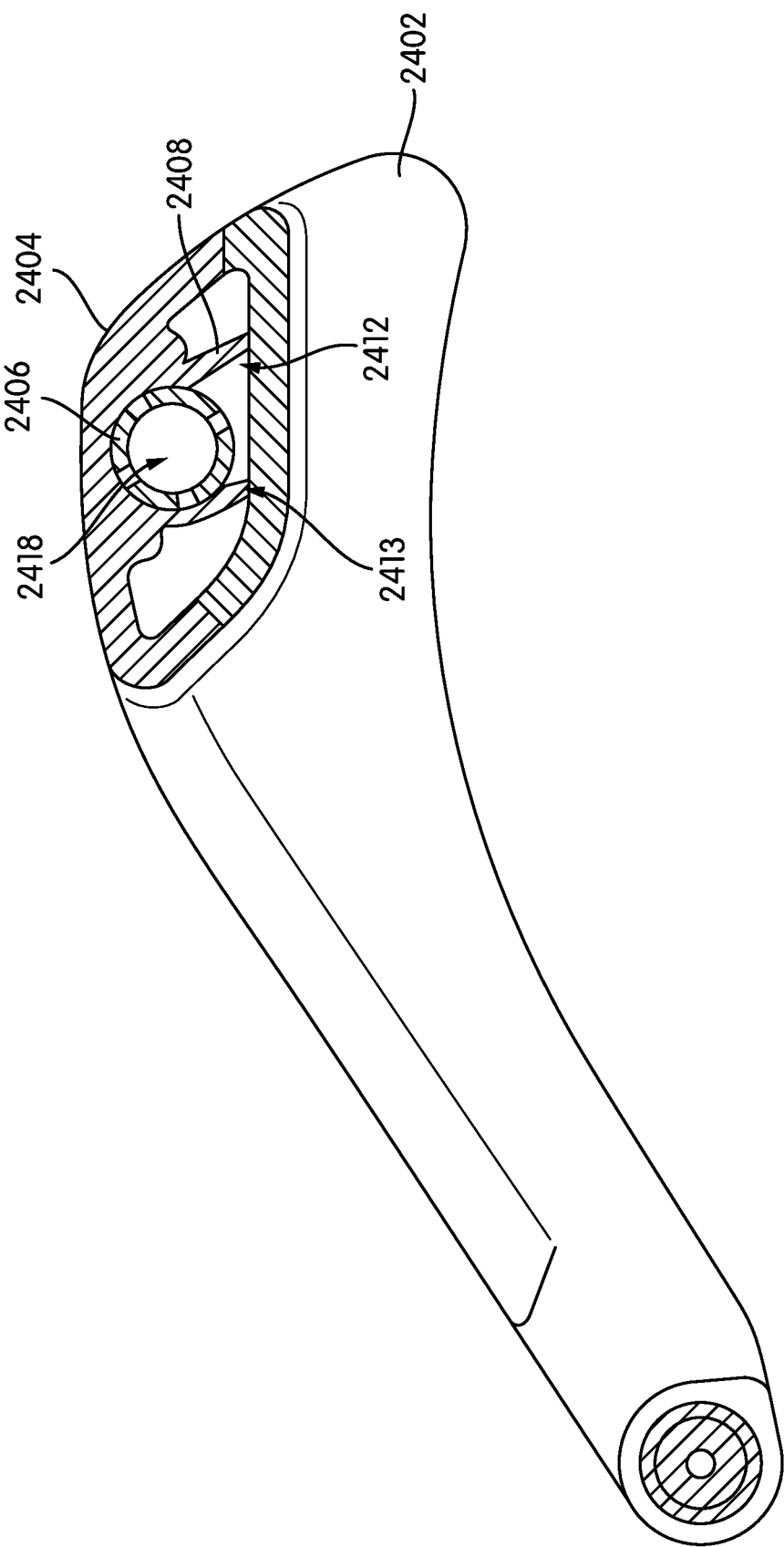
FIG. 26 is a cross-sectional view of the inboard leg and outboard leg assembled together taken along line 26-26 of FIG. 24.
Figure 27:
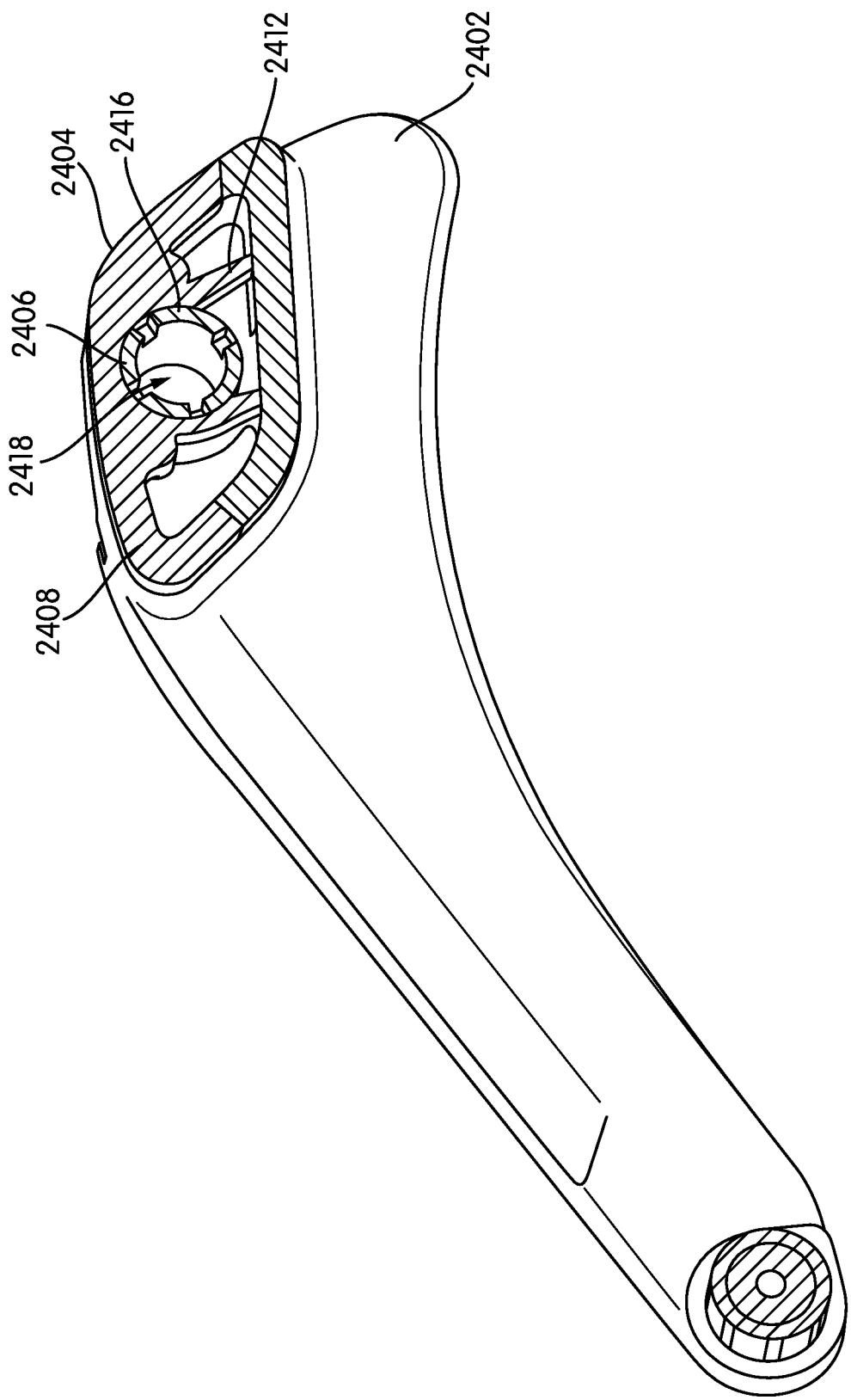
FIG. 27 is a perspective view of the cross-sectional view of FIG. 26.
Figure 28:
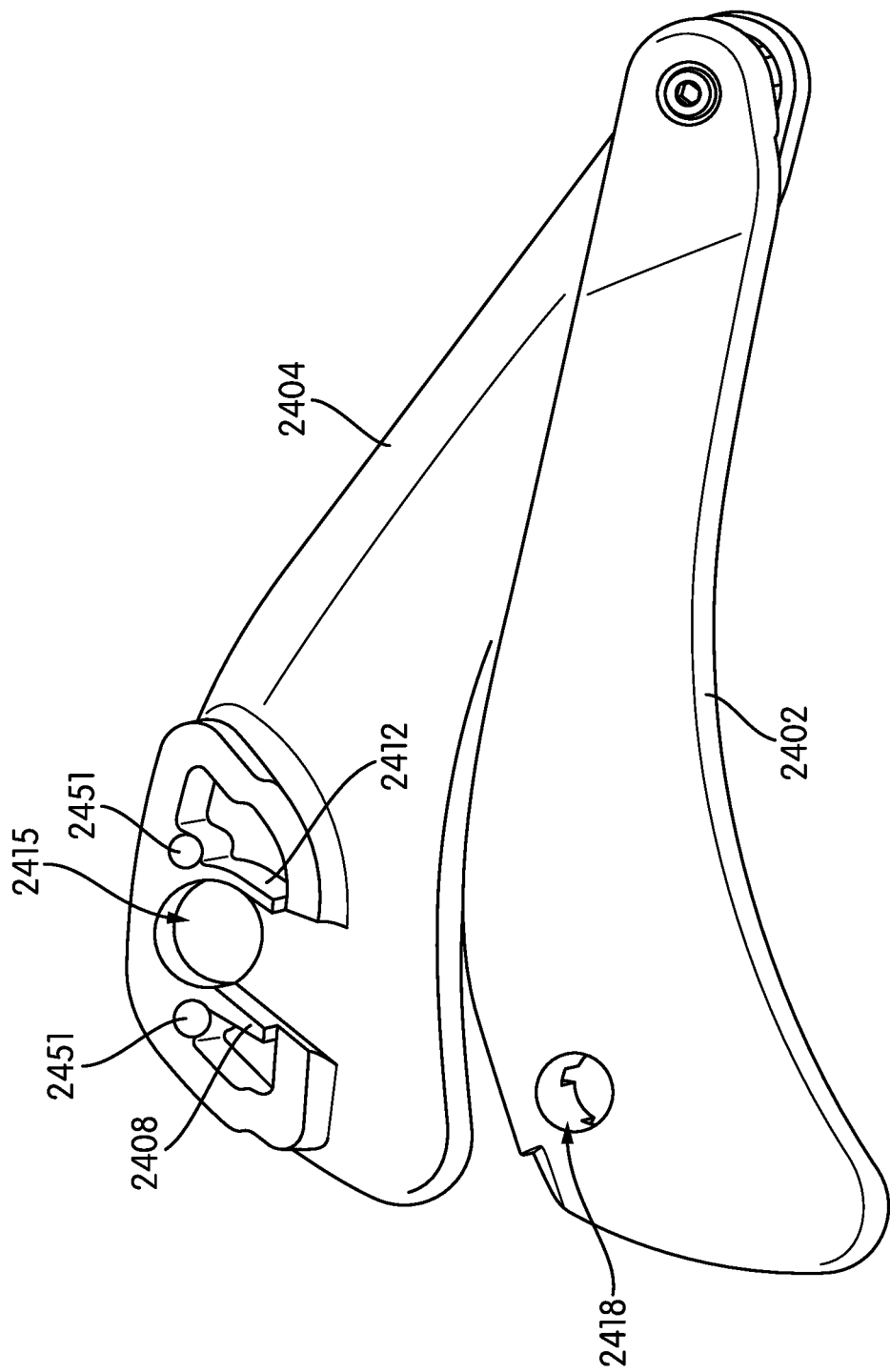
FIG. 28 is a perspective view of the embodiment of FIG. 24.
Figure 29:
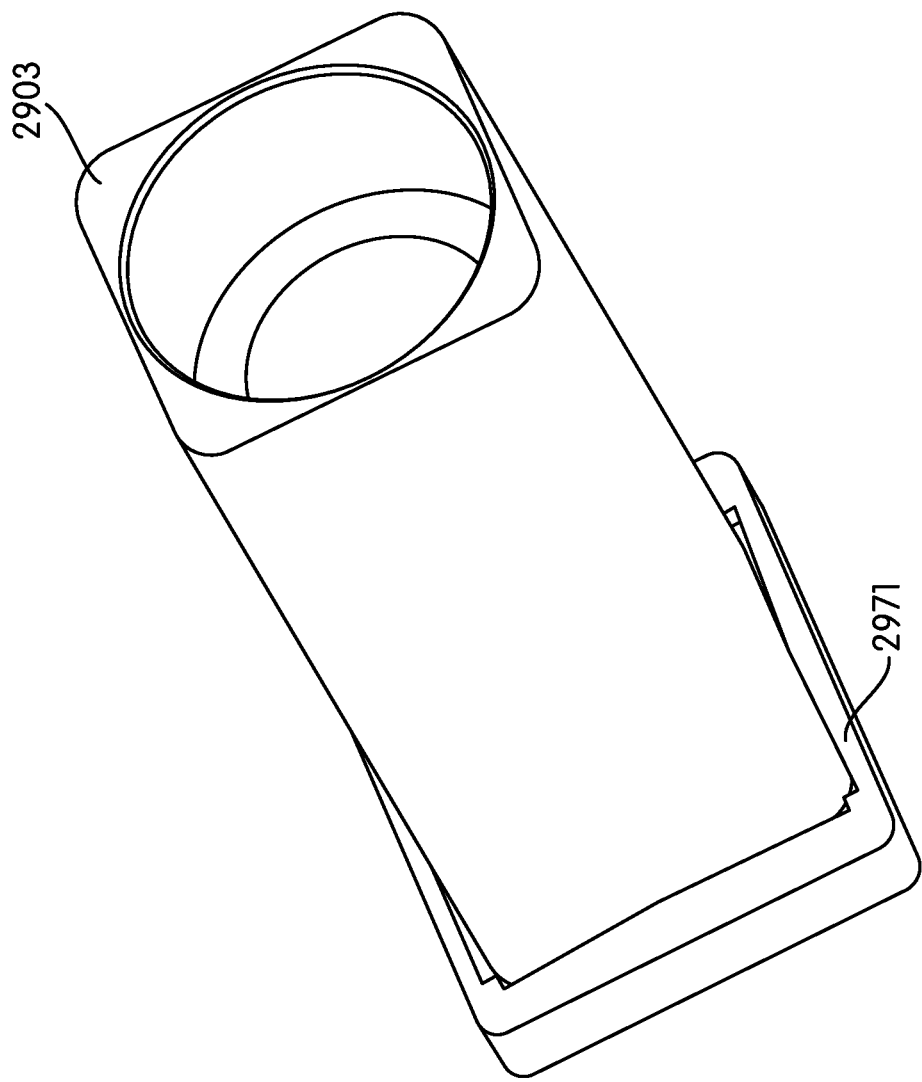
FIG. 29 is a perspective view of a square sleeve for use in connection with the various embodiments.
Figure 30:
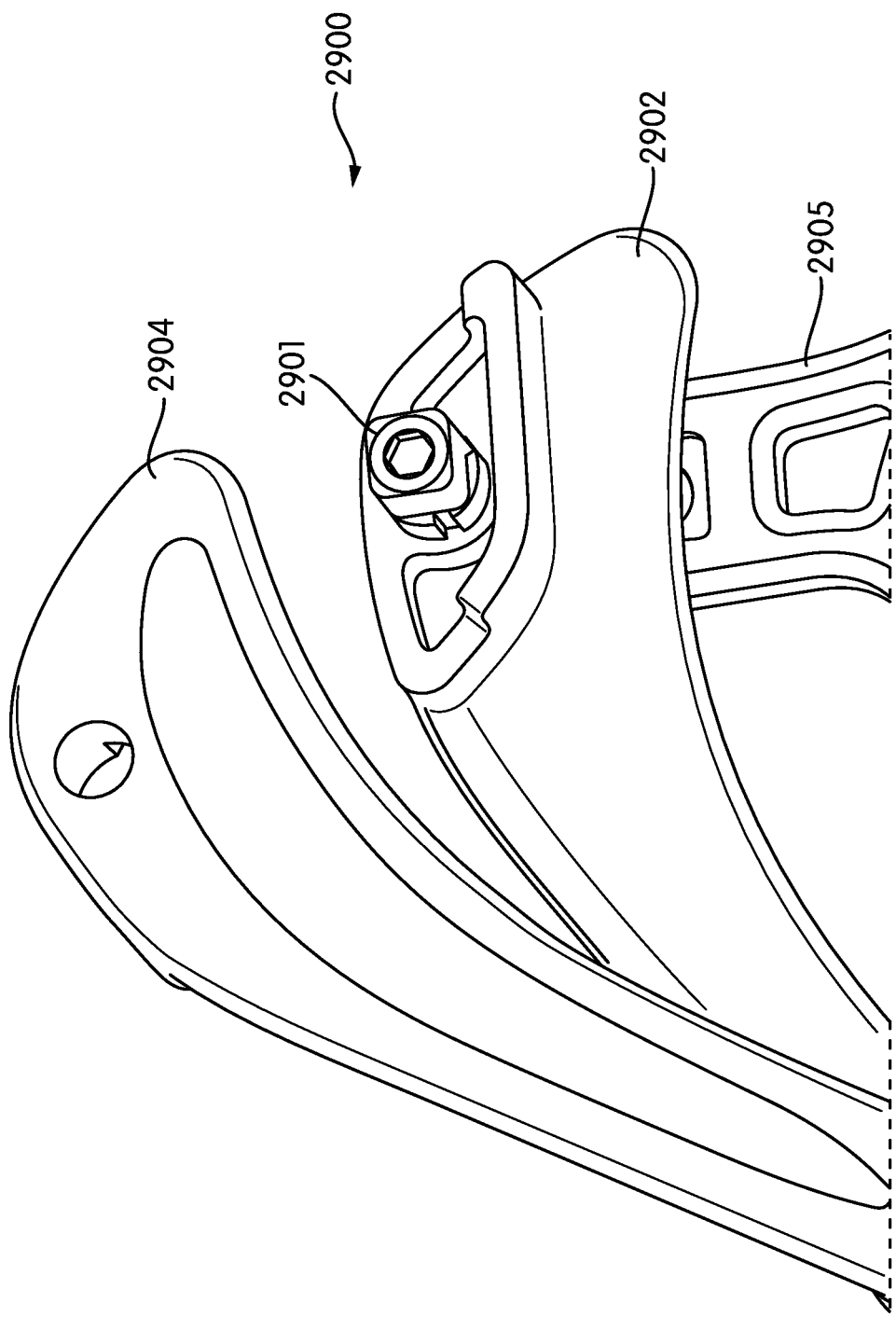
FIG. 30 is a perspective view of an alternative embodiment showing a square sleeve.
Figure 31:
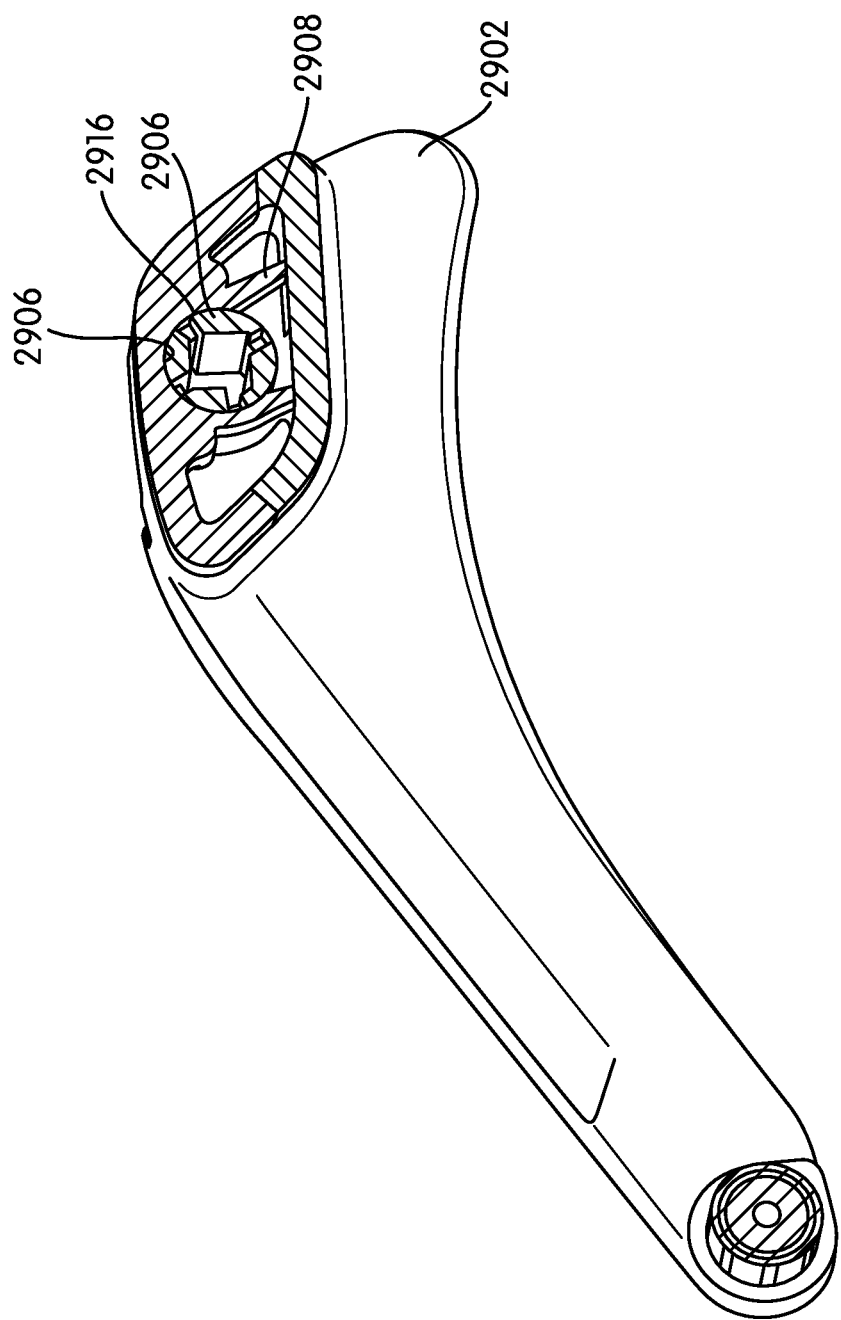
FIG. 31 is a perspective view similar to FIG. 27 but illustrating a mating portion accommodating a square sleeve.
Figure 32:
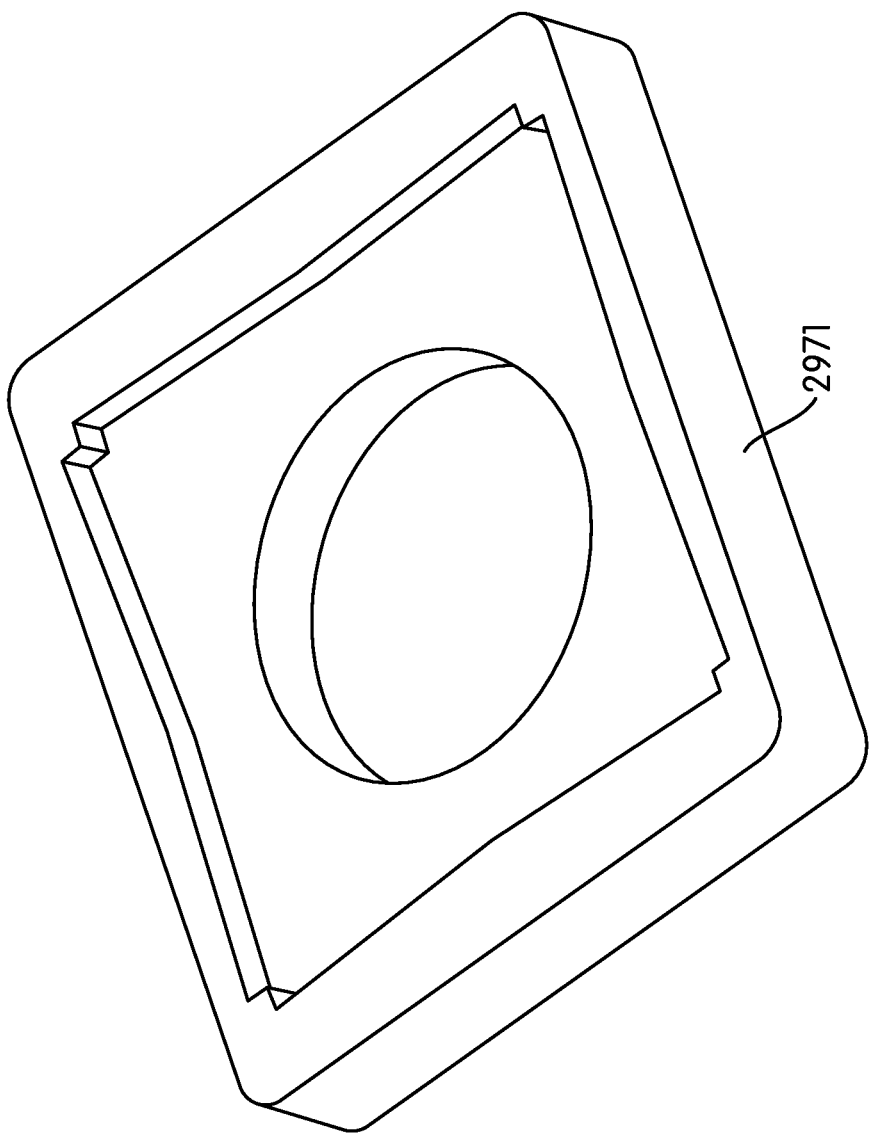
FIG. 32 is a perspective view of an optional base that may position a sleeve.

The interrelationship of the inboard leg and the outboard leg may be best seen in FIGS. 25-27. To assemble the assembly 2400, the outboard leg 2404 may be pivoted around a pivot 2417 located remote from the fastener shaft 2401, and the outboard leg 2404 may take an "open" position, like that shown in FIG. 25 or a "closed" position shown in FIGS. 24, 26, and 27. When the outboard leg 2404 is rotated into the closed position, the second mating portion 2408 on the outboard leg 2404 may deflect around the first mating portion 2406 on the inboard leg. After the legs 2412 of the second mating portion 2408 pass the circular first mating portion 2406, the legs 2412 return to their position as shown in FIGS. 26 and 27. This return may cause the remainder of the second mating portion to clamp onto the first mating portion 2406, thereby deflecting or deforming the fingers 2416 to cause the fingers 2416 to engage the shaft 2401.

In many embodiments, it may be desirable to incorporate a lock into the assembly to further secure the inboard leg 2402 to the outboard leg 2404. In the illustrated embodiment, a secondary fastener structure may be incorporated into the inboard leg 2402 and the outboard leg 2404. In some embodiments, the outboard leg 2404 may include one or more secondary projections 2451 that may mate with secondary recesses 2453 in the inboard leg. The secondary projections 2451 and the secondary recesses 2453 may provide an auditory and/or a tactile aid to help the user determine when the inboard leg 2402 and the outboard leg 2404 are in the appropriate position and orientation with respect to one another.

In the embodiments shown in FIGS. 24-32, the use of a sleeve having the general properties described above may be particularly desirable to assist a user in properly orienting the assembly 2400 onto the shaft 2401. In the embodiment illustrated in FIGS. 24-28, the sleeve 2403 is generally cylindrical or has a generally circular cross section. When a sleeve 2403 has a generally cylindrical shape, a user can position the assembly on the sleeve or the cylindrical shaft or fastener 2401 both rotationally around the shaft 2401 or the sleeve 2403 by rotating the position of the inner leg 2402 before engaging the outer leg 2403. In the embodiments of FIGS. 24-32, where the axis of rotation is remote from the axis of the shaft 2401, it may be particularly desirable to use a sleeve 2403 in connection with the shaft 2401. That is because the outer leg 2404 must have sufficient clearance from the shaft 2401 and sleeve 2403 to allow the second mating portion 2408 on the outer leg 2404 to rotate into engagement with the first mating portion 2406 on the inner leg 2402 without interference from the sleeve 2403 and the shaft 2401. In such an embodiment, the shaft or fastener 2401 can be placed within the sleeve 2403 and fully tightened to the bracket 2405 at an appropriate height. The inner leg 2404 may then be positioned on the sleeve 2403 at an appropriate lateral and rotational position. Then the outer leg 2406 may be rotated into mating position to substantially secure the inner leg 2404 and the outer leg 2406 to one another.

In other embodiments, where it is desirable for only the infinite lateral adjustment to be governed by the mating of the first and second mating members, the sleeve may take another shape. In the embodiment of FIGS. 29-32, the sleeve 2903 is shown as having a substantially rectangular or square outer profile. A different shape outer profile could be possible and also restrict rotational movement of the assembly 2900 on the sleeve 2903 and shaft or fastener 2901. For example, the outer profile could be hexagonal or oval, which would restrict rotation, but allow lateral adjustment. In some embodiments, it may be desirable for the sleeve 2903 to rest in a base 2971 to allow for a better contact between the sleeve 2903 and the bracket 2905.

The embodiment shown in FIGS. 29-32 is substantially the same in function as that shown in FIGS. 24-28, except that the inner profile of the fingers 2916 on the first mating portion 2906 on the inner leg 2902 of the assembly 2900 should be configured to have substantially the same inner shape as the outer shape of the sleeve 2903. With such a configuration, when the second mating portion 2908 deforms the first mating portion 2906, adequate contact is made between the first mating portion and the sleeve 2903 and the first mating portion 2906. The outer shape of the first mating portion 2906 may desirably remain round to allow for ease of installation and removal of the outer leg 2904 through the relative rotation of the inner leg and the outer leg.

When a non-cylindrical sleeve is used, such as in the embodiment of FIGS. 29-32, the user may adjust the assembly 2900 vertically, rotationally and laterally through two different mechanisms. First, the user may position the assembly 2900 vertically by selecting an appropriate position for the fastener 2901 and sleeve 2903 on the bracket

2905 and tightening the fastener 2901 into a conventional nut (not shown). Then the user can position the assembly laterally by placing the inner leg 2902 onto the sleeve 2903 in an appropriate lateral position. Then the user can rotate the outer leg 2904 relative to the inner leg 2902 to substantially secure the inner leg 2902 and the outer leg 2904 relative to one another. Finally, if the user wishes to change the rotational position of the assembly 2900, the user may loosen the fastener 2901, rotate the assembly 2900 to the correct position, and re-tighten the fastener 2901.

By using the present design, a user can make various adjustments to the position of an upper chain guide without using tools. In the embodiments of FIGS. 5-22 and 23-32, the shaft (like that illustrated in FIG. 23), can be installed at a particular height on a bracket, using a combination of fasteners well known in the art. The user may then place the inboard leg on or around the shaft. The user may then place the outboard leg onto the inboard leg and rotate the outboard leg into position. If the user wishes to adjust the position of the chain guide in a lateral or rotational direction, the user can simply rotate the outboard leg to release the engagement between the inboard and outboard legs, reposition the assembly in a lateral or rotational direction, and rotate the outboard leg to lock the assembly in place relative to the shaft. This installation method may allow a user to have infinite lateral and rotational adjustability without the use of tools.

An alternative embodiment is shown in FIGS. 33-43. Looking first at the overall assembly 3300, shown best in FIGS. 33-35, the assembly 3300 may include a fixed bracket 3302 that may be attached to the bicycle frame 15 (not shown in these FIGS.) using first bolts 3304 in a conventional manner. The first bracket 3302 may be secured to the frame 15 in any conventional manner that varies from the one shown in the FIGS, as is well known by persons of skill in the art. The fixed bracket 3302 may define at least one slot 3306. The assembly may further include a slidable bracket 3308. The slidable bracket 3308 may be adjustably secured to the fixed bracket 3302 by a second bolt 3310. In some embodiments, the second bolt 3310 may pass through the at least one slot 3306 in the fixed bracket 3302 and a first aperture 3312 defined in the slidable bracket 3308. The slidable bracket 3308 may be adjusted to an appropriate vertical position and then a nut or other conventional structure (not shown) may be used to releasably secure the fixed bracket 3302 and the slidable bracket 3308 together in a desirable position. In other embodiments, the first aperture 3312 in the slidable bracket 3308 may be threaded and the second bolt 3310 may be directly secured to the slidable bracket 3308. In such an embodiment, it may be desirable to configure the second bolt 3310 with a recess 3314 configured to receive an appropriate tool, such as the hex-shaped recess illustrated. In some embodiments, the slidable bracket 3308 may have a first mating face 3316 (see FIG. 34) and the fixed bracket 3302 may have a second mating face 3318 (see FIG. 35). The first mating face 3316 and the second mating face 3318 may include one or more discontinuities to provide for alignment of the fixed bracket 3302 and the slidable bracket 3308. In many embodiments, one of the first mating face 3316 and the second mating face 3318 may include a projection or finger and the other of the first mating face 3316 and the second mating face 3318 may include a groove or recess. The finger and groove may be positioned to be approximately parallel to the at least one slot 3306 when in operative position, to give a user a tactile and visual aid to positioning the fixed bracket 3302 and the slidable bracket 3308 in an appropriate position to align the at least one slot 3306 and the first aperture 3312 into a position where the fixed bracket 3302 and the slidable bracket 3308 may be easily secured to one another using the fastener 3310.

The first aperture 3312 may be defined near a first end 3316 of the slidable bracket 3308. The slidable bracket 3308 may further define a second aperture 3320 near a second end 3322. A shaft 3324 may be secured to the slidable bracket 3308. In many embodiments, the shaft 3324 may include a shaft aperture 3326. The shaft 3324 may include a first end 3328 and a second end 3330. The shaft aperture 3326 may include a corresponding first end 3332 and a second end 3334. The first end 3332 of the shaft aperture 3326 may be internally threaded. A third bolt 3336 may pass through the second aperture 3320 in the slidable bracket 3308 and into the threaded first end 3332 of the shaft aperture 3326. The third bolt 3336 and the shaft 3324 may then be tightened by rotating to removably secure the shaft 3324 to the slidable bracket 3308.

In the illustrated embodiment, the shaft 3324 has a hexagonal outer profile. In many embodiments, a hexagonal profile may be desirable. However, in other embodiments, other profiles may be used for ease of manufacturing or to achieve other advantages. In the illustrated embodiments, the use of a hexagonal profile may allow a user to use a wrench or other tool to easily attach the shaft 3324 to the slidable bracket 3308 or remove it therefrom. The hexagonal profile may allow a user to firmly grip the shaft manually if the user wishes to secure or remove it without the use of a tool. In alternative embodiments, the shaft may be circular to allow for a different adjustability (as will be described in more detail below) or could have more or fewer sides, such as a square or an octagonal profile. In many embodiments, a designer may select a profile that a user may find aesthetically pleasing, in addition to having other, functional features.

Figure 33:
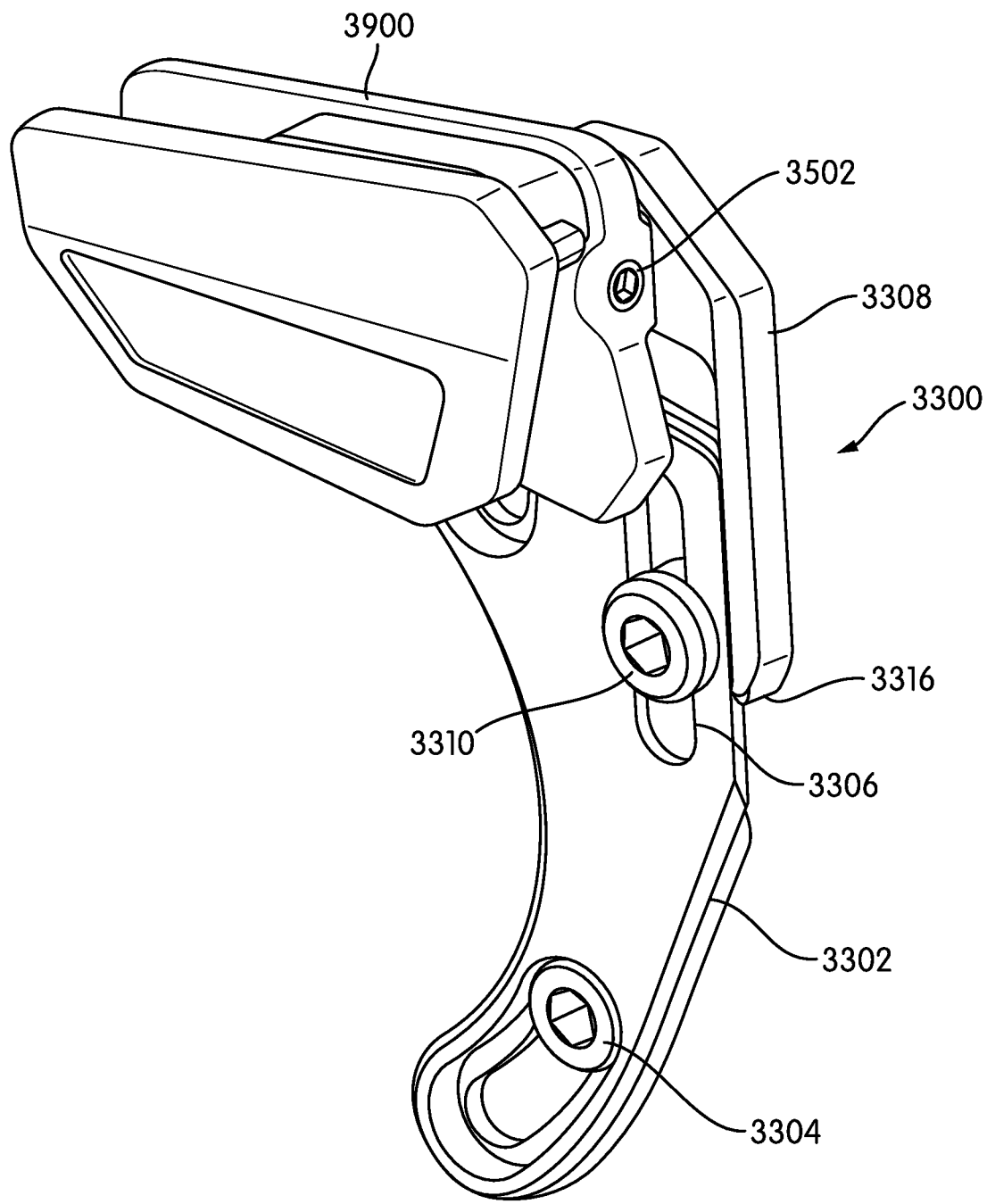
FIG. 33 is a perspective view of an alternative embodiment of an assembly according to the disclosure.
Figure 39:
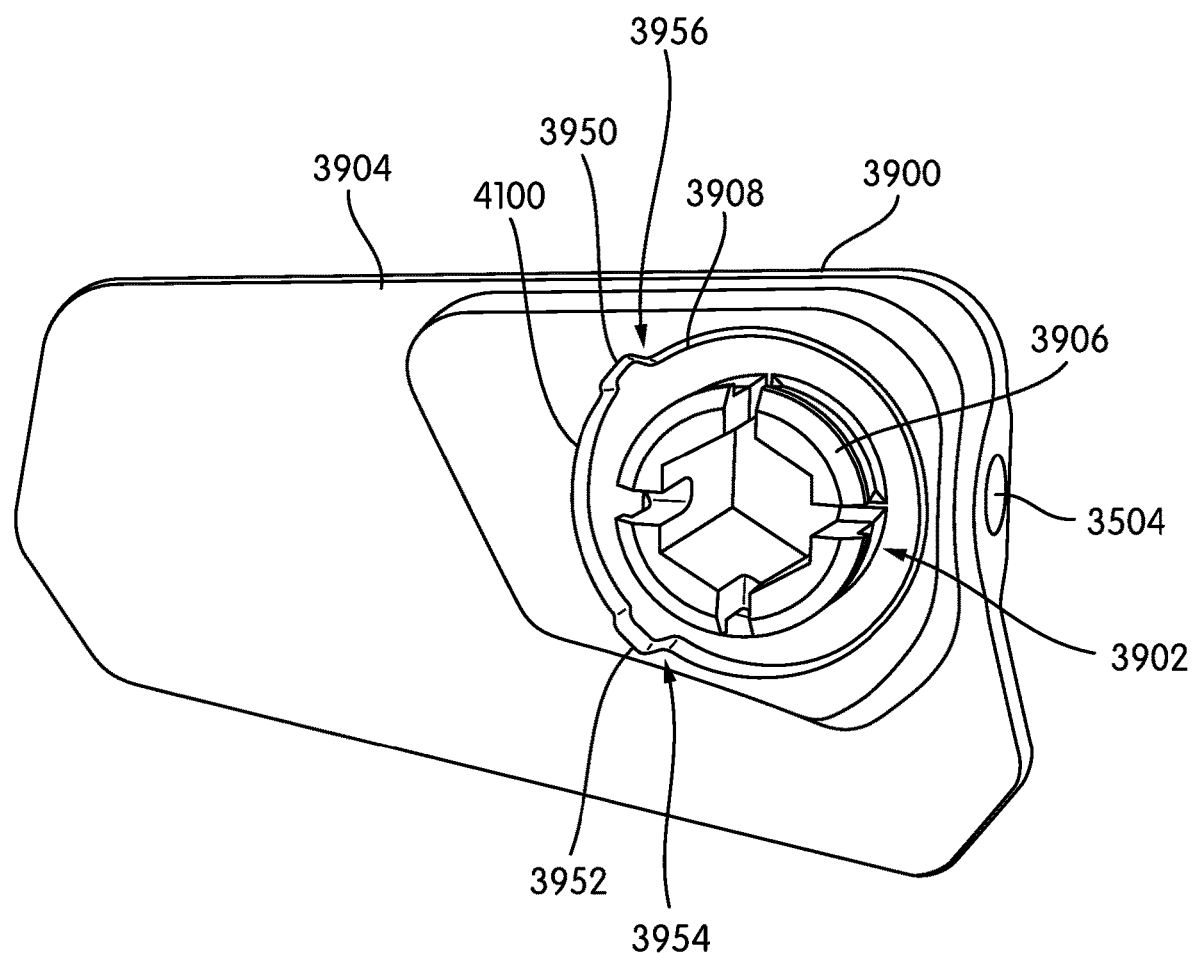
FIG. 39 is a perspective view of the inboard leg of FIG. 33.
Figure 41:
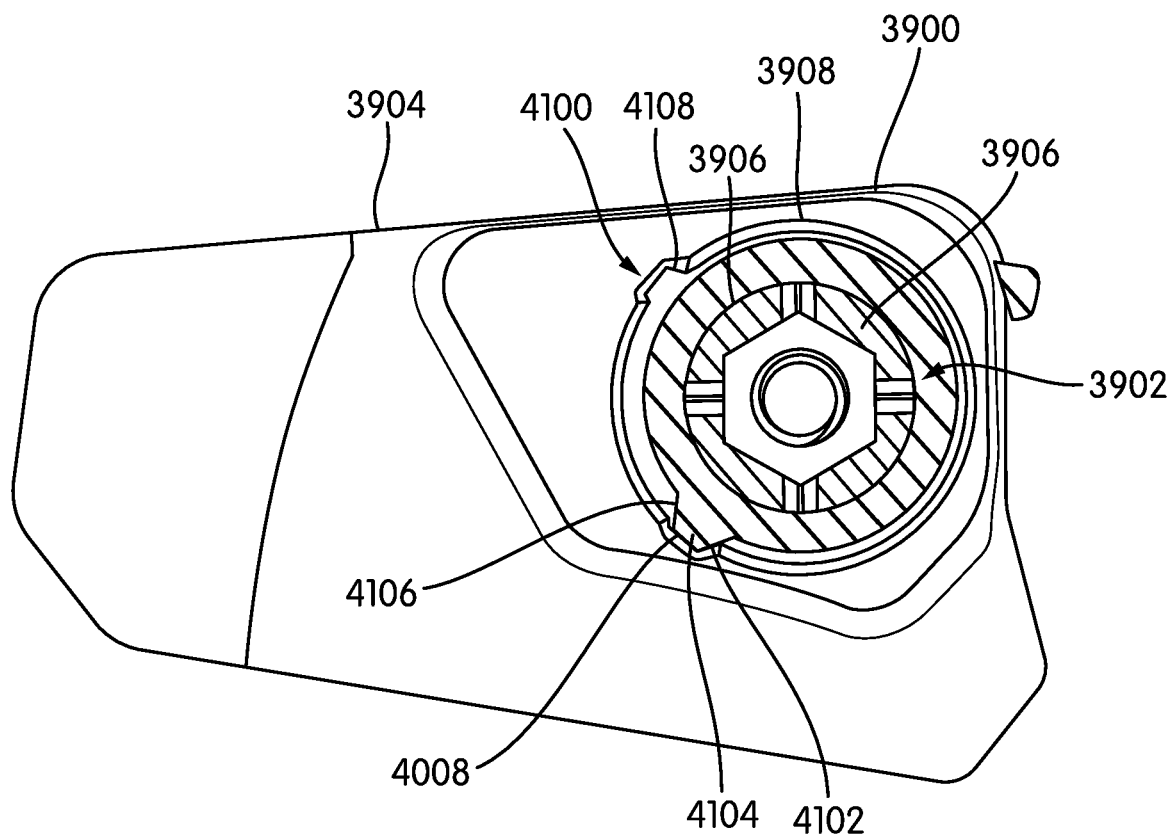
FIG. 41 is a cross-sectional view of the legs of FIG. 36 taken along line 41-41.

The assembly 3300 may include an inboard leg 3900, as may be best seen in FIGS. 33, 39, and 41. The inboard leg may include a first mating portion 3902 that may extend from an inboard leg face 3904. In the embodiment shown, the first mating portion may include at least one first projection that may include one or more fingers 3906. In many embodiments, it may be desirable for the first mating portion 3902 to be integrally formed with the inboard leg face 3904. In many embodiments, the fingers 3906 may be made of a material that allows the fingers 3906 to be slightly flexible, so that they may be deformed slightly as will be discussed in greater detail below.

The inboard leg face 3904 may define a recess 3908. The recess 3908 may be annular and may substantially surround the first mating portion 3902. The recess 3908 may have a single width or may vary in width as shown most clearly in FIG. 41. The variation in width may assist a user in positioning a corresponding outer leg in a variety of positions, as will be discussed in greater detail below.

Figure 40:
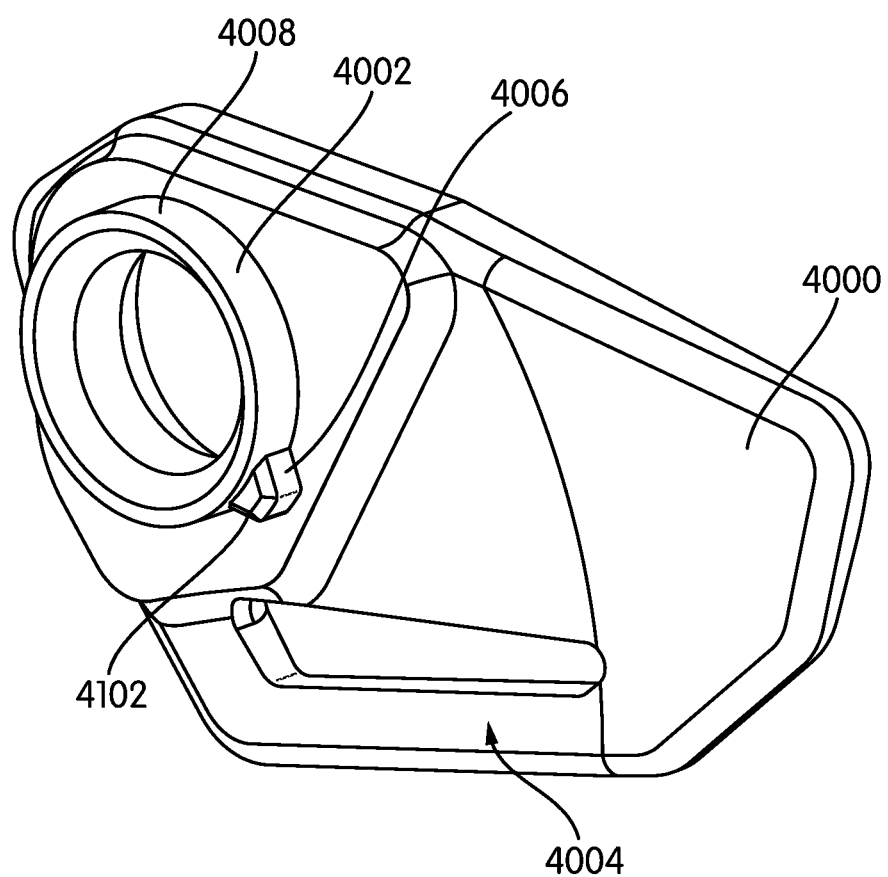
FIG. 40 is a perspective view of the outboard leg of FIG. 33.

The structure of the outboard leg 4000 may be best seen in FIG. 40. The outboard leg 4000 may include a second mating portion 4002 that may extend from an outboard leg face 4004. In the embodiment shown, the second mating portion 4002 may comprise second projection in the form of an annular ring with one or more fingers or projections 4006 extending outwardly from an outer circumference 4008 of the second mating portion 4002. In many embodiments, it may be desirable for the second mating portion 4002 to be integrally formed with the outboard leg face 4004. In many embodiments, the second mating portion 4002 may be made of a material that allows the second mating portion 4002 to be slightly flexible, so that it may be deformed slightly as will be discussed in greater detail below.

The inboard leg 3900 and the outboard leg 4000 may interfitted or substantially secured to one another laterally without being attached to the remainder of the structure 3300. This interfitting may be understood most clearly in an examination of FIG. 38. In the illustrated embodiment, the inboard leg 3900 and the outboard leg 4000 may be positioned adjacent one another so that the first mating portion 3902 and the second mating portion 4002 are positioned adjacent one another. The outboard leg 4000 may be moved in the direction 3802 relative to the inboard leg 3900. The inboard leg 3900 may be moved in the direction 3804 relative to the outboard leg 4000. A user may choose to hold one of the legs 3900, 4000 in a single position and move the other leg, or the user may move both legs simultaneously, as the user prefers. When the legs are brought together, the second mating portion 4002 may deform slightly outwardly. A taper, such as the angled portion 3806, on the first mating portion 3902 may contact a taper, such as the curved inner diameter 3808, on the second mating portion 4002. This contact may create an outward pressure on the second mating portion 4002 and an inward pressure on the first mating portion 3902. This relative pressure may allow each of the first mating portion 3902 and the second mating portion 4002 to be deformed or deflected and pass by one another. In many embodiments, the outboard face 4000 may include a groove or recess 3810 that is at least as wide as a corresponding lip 3812 on the first mating portion 3902. The correspondence in shape and size between the lip 3812 and the groove 3810 may allow the first mating portion 3902 and the second mating portion 4002 to return to their non-deformed configurations. This may be referred to as a "snap fit" configuration, and this type of configuration is well known to designers of this type of product. When the lip 3812 enters the groove 3810, the inboard leg 3900 and the outboard leg 4000 are substantially secured to one another laterally. Such a design is configured to allow the engagement of the inboard leg 3900 and the outboard leg 4000, but not to easily permit the removal of the two legs from one another.

Figure 34:
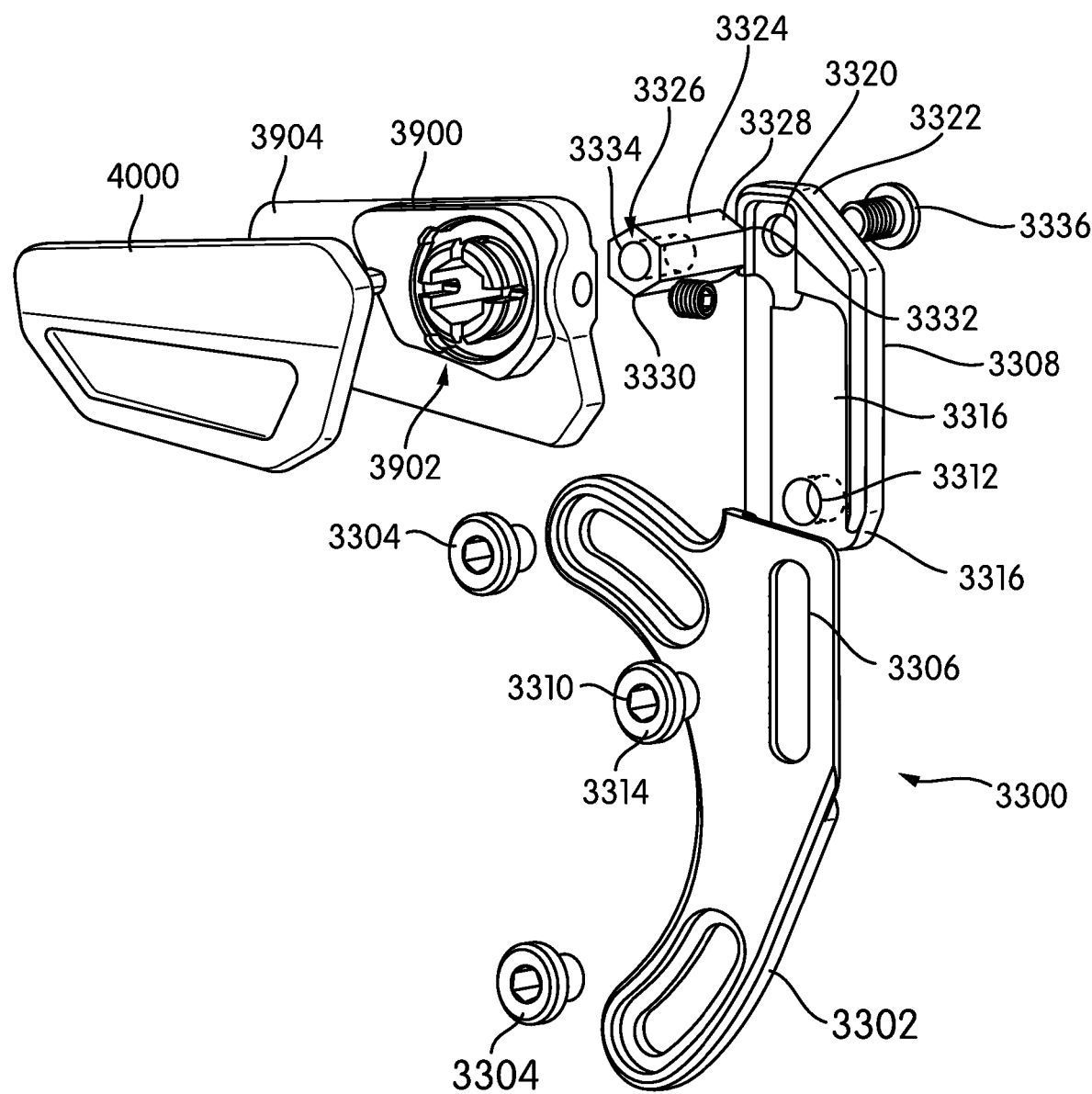
FIG. 34 is an exploded view of the embodiment of FIG. 33.
Figure 35:
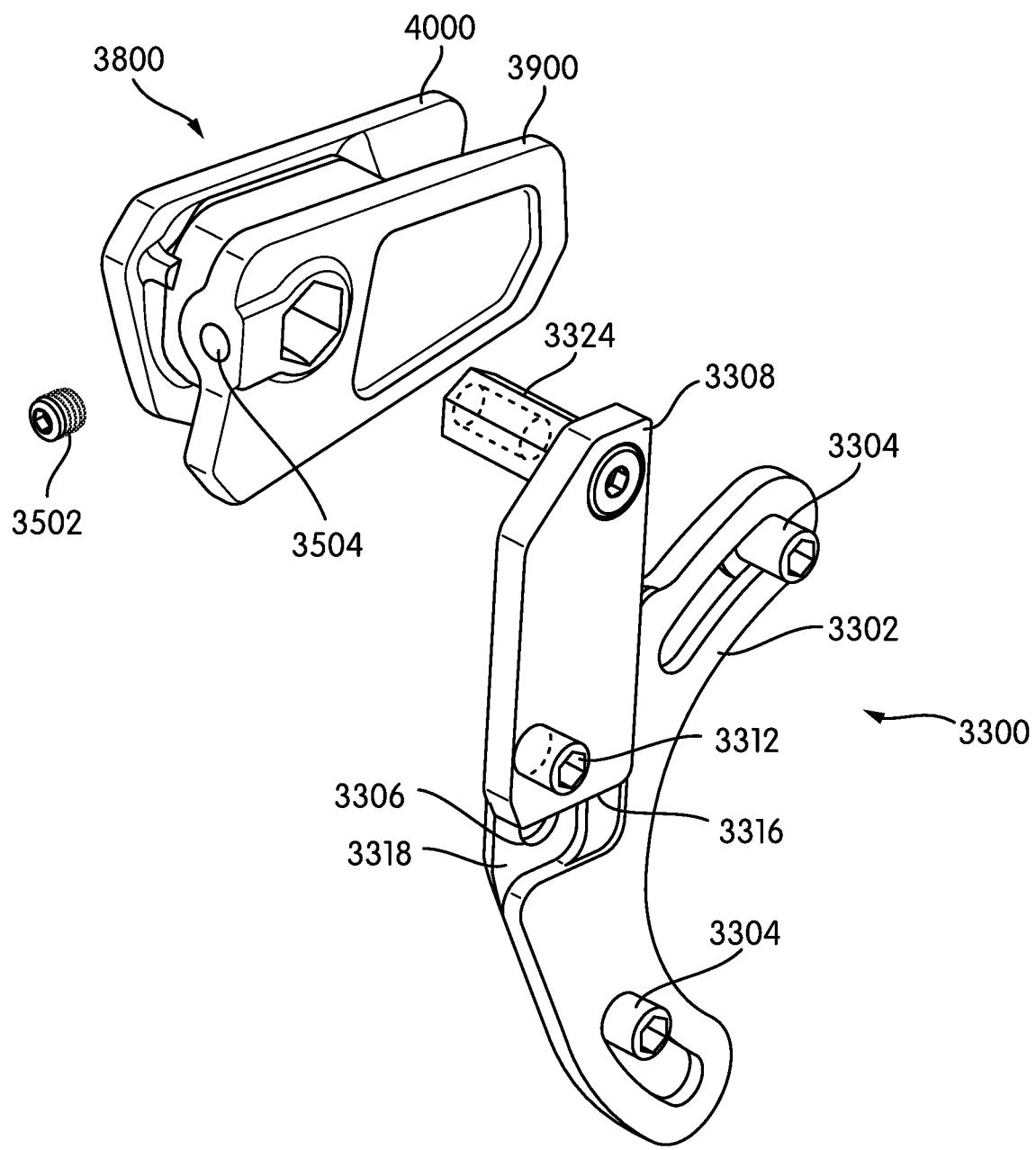
FIG. 35 is a partially exploded view of the embodiment of FIG. 33.
Figure 36:
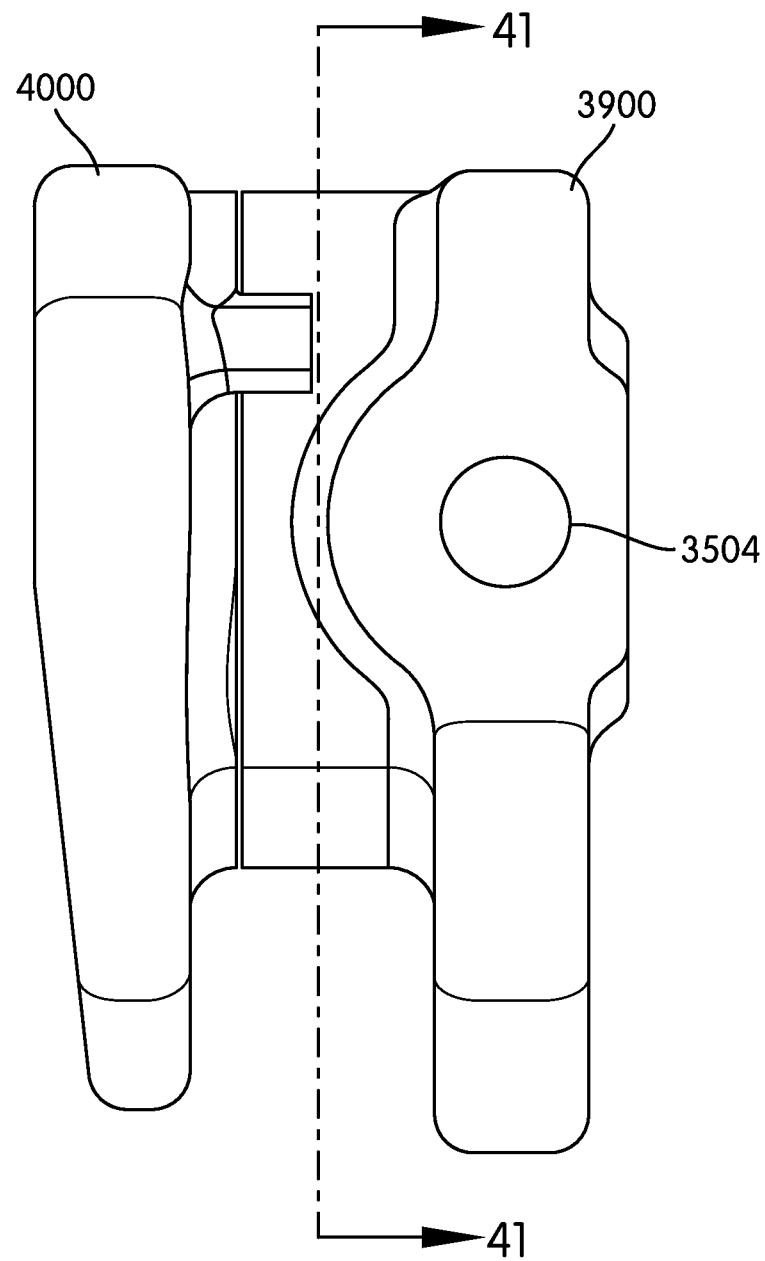
FIG. 36 is an end view of an assembled inboard leg and outboard leg according to the embodiment of FIG. 33.

As may be seen most clearly in FIGS. 34 and 35, after the inboard leg 3900 and the outboard leg 4000 are substantially secured to one another, they may be interfitted with the remainder of the assembly. The assembled legs 3800 may be placed onto the shaft 3324 and secured laterally in place with a fourth bolt 3502. In some embodiments, one of the inboard leg 3900 and the outboard leg 4000 may include a threaded recess that may allow the fourth bolt 3502 to engage the assembled legs 3800 and the shaft 3324. In the illustrated embodiment, the threaded recess 3504 is defined within the inboard leg 3900. In many embodiments, the fourth bolt 3502 may include a conventional hex recess to allow a user to tighten the fourth bolt 3502 with a conventional hex wrench. The tightening of the fourth bolt 3502 on the shaft 3324 may secure the assembled legs 3800 in a lateral position desired by the user.

After the legs 3900 and 4000 have been assembled into the assembled legs assembly 3800, the legs 3900 and 4000 are able to rotate relative to one another, even though they are substantially fixed laterally, vertically, and horizontally to one another. In some embodiments, it may be desirable to include corresponding features that define the extent to which the outboard leg 4000 may rotate relative to the inboard leg 3900.

Figure 37:
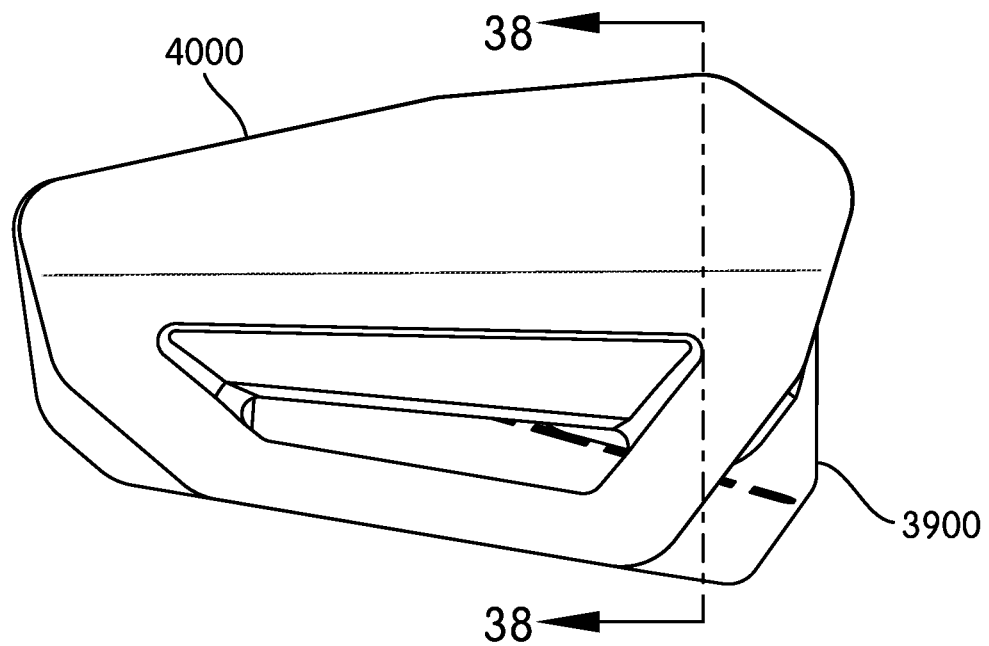
FIG. 37 is a side view of the legs of FIG. 36.
Figure 38:
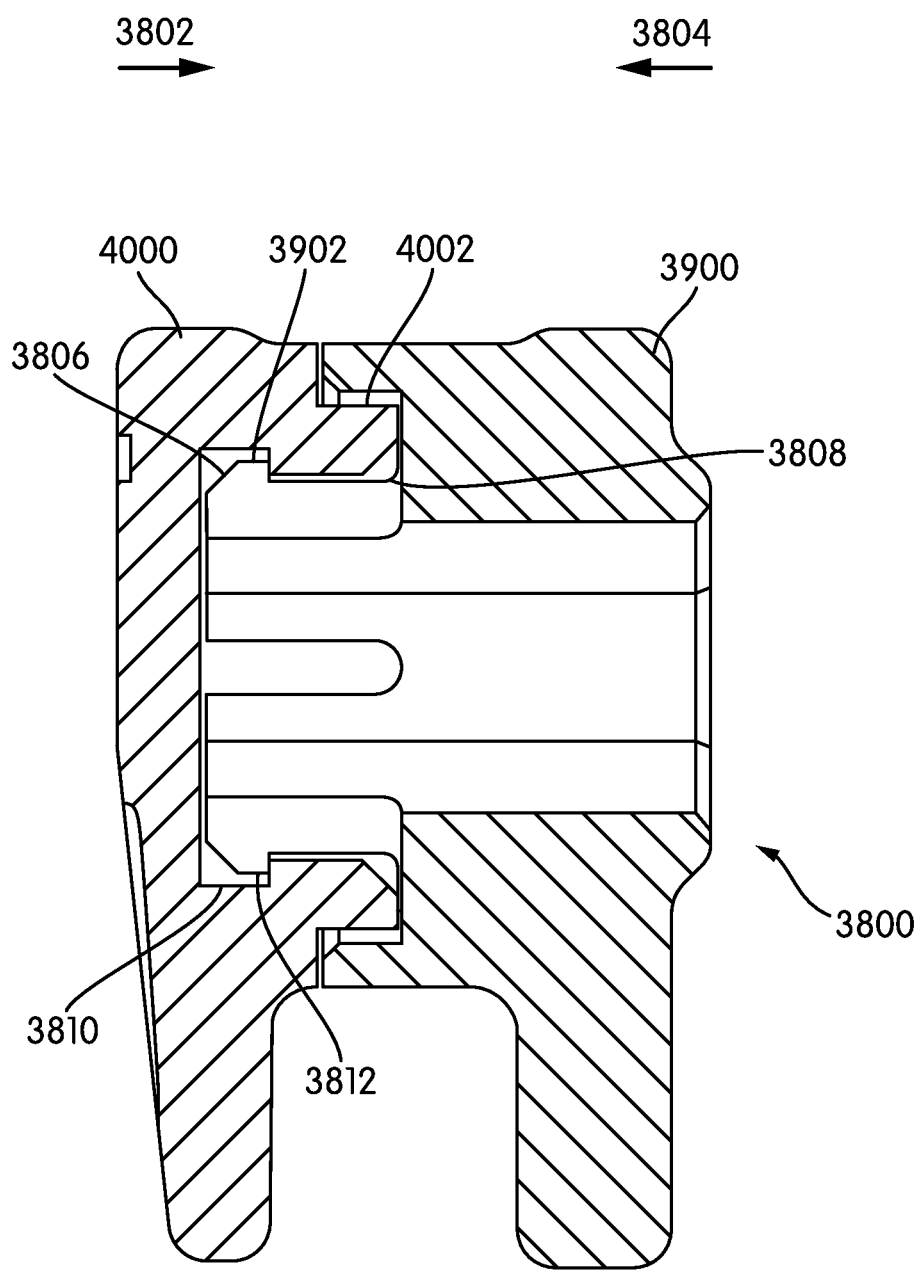
FIG. 38 is a cross-sectional view of the legs of FIG. 37 taken along line 38-38.
Figure 42:
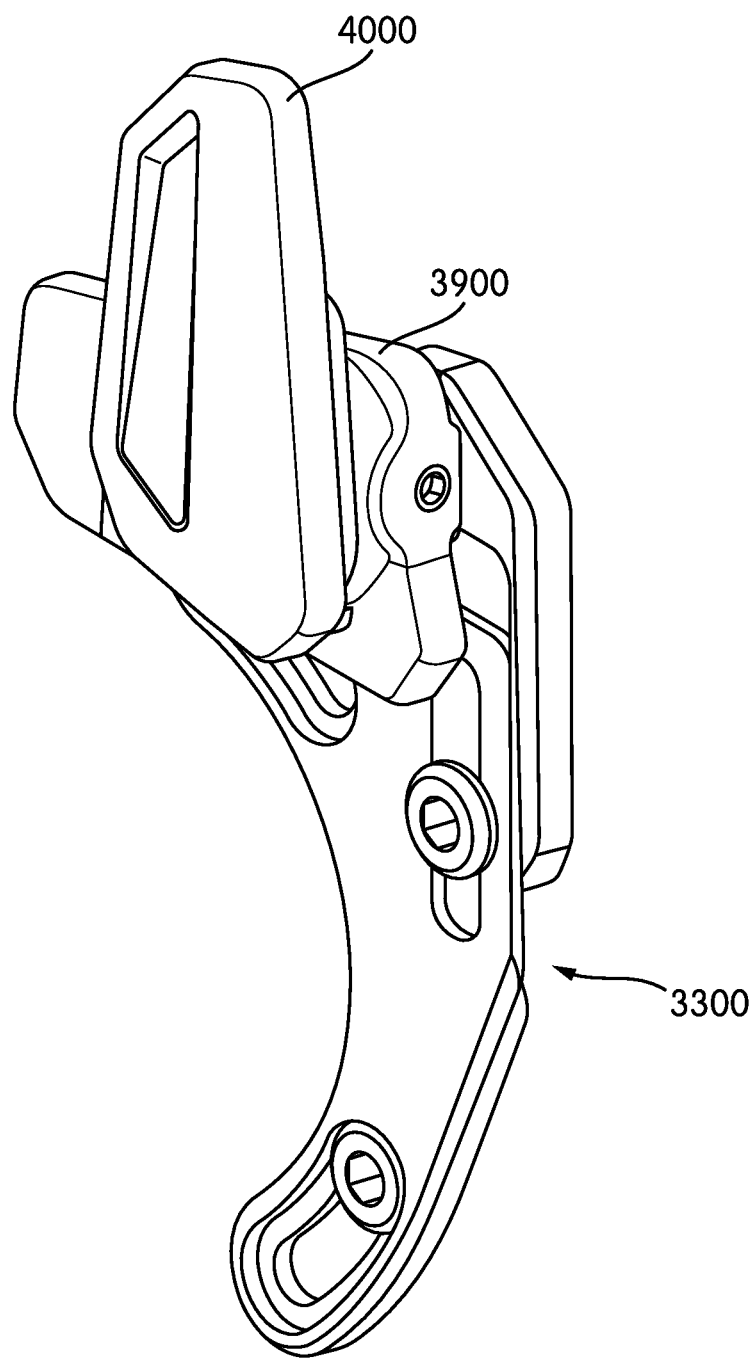
FIG. 42 is a perspective view of the assembly of FIG. 33 with the outboard leg in a rotated position.
Figure 43:
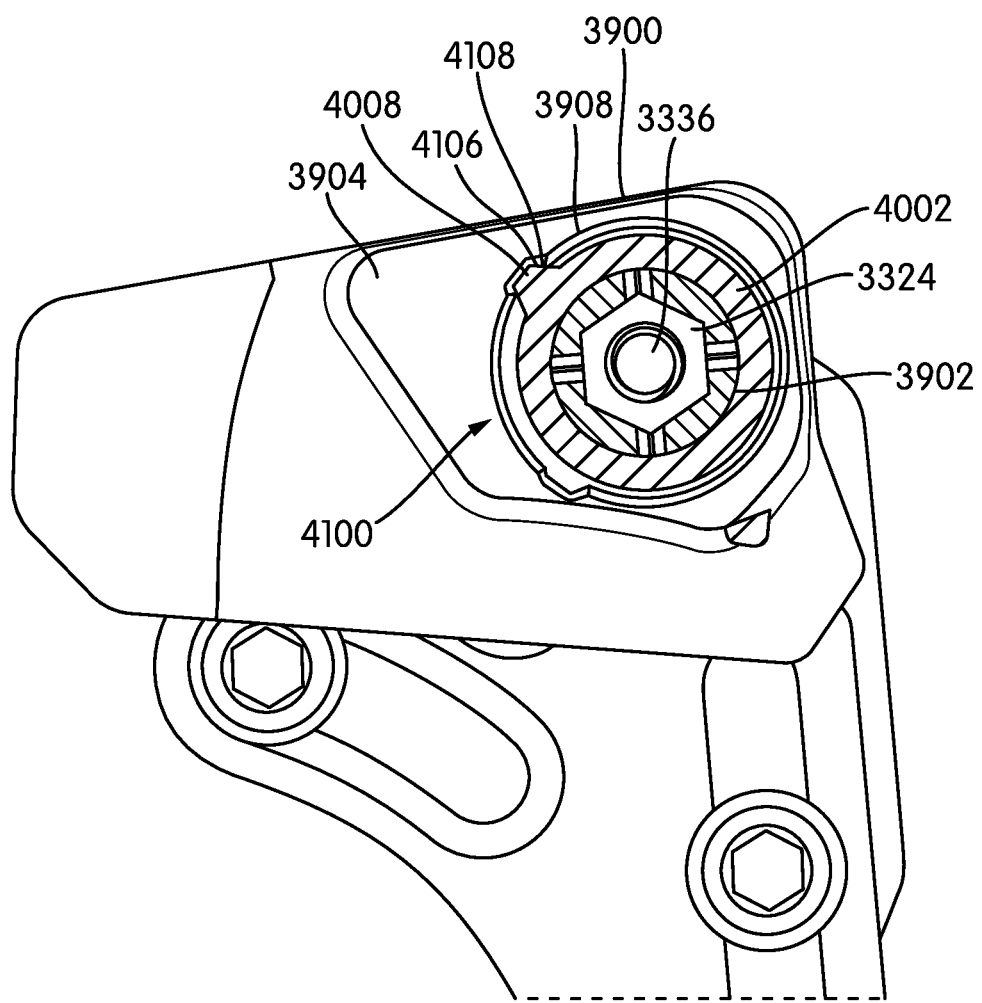
FIG. 43 is a cross sectional view similar to that of FIG. 41 with the outboard leg in the position shown in FIG. 42.

As shown in FIG. 40, the second mating portion 4002 may include an annular ring that includes a finger 4006 that projects from the outer circumference 4008 of the annular ring. The recess 3908 adjacent the first mating portion 3902 may include a corresponding section of increased width 4100, as may be best seen in FIGS. 41 and 43. In the configuration shown in FIG. 41, the finger 4008 may be positioned within the thicker portion of the recess 4100. The finger 4008 may include a first stop surface 4102 that may contact a corresponding second stop surface 4104 on the recess portion 4100. This contact between the first stop surface 4102 and the second stop surface 4104 may define the lower position of the outboard leg 4000 as shown in FIG. 37. However, when a user wishes to move the outboard leg 4000 out of the way in order to do something with the chain, the use may rotate the outboard leg 4000 clockwise. This movement may move the finger 4008 within the enlarged recess portion 4100 to the position shown in FIG. 43, thereby positioning the outboard leg 4000 as shown in FIG. 42. In such a position, a third stop surface 4106 may contact a fourth stop surface 4108 at another extreme end of the enlarged recess portion.

As shown most clearly in FIG. 39, the enlarged recess portion 4100 may include a first finger recess 3952 at a first extreme end 3954 and a second finger recess 3950 at a second extreme end 3956. The use of the finger recesses 3952 and 3950 may allow a user to have an improved tactile feel when the outboard leg 4000 is rotated and may tend to hold the outboard leg 4000 in a fully upward or fully downward position.

In the disclosed embodiments, structures and apertures of various sizes and shapes were illustrated. The precise configurations of these items are shown in an illustrative fashion only. A designer can easily change the shape, size, material, number or other features of these items to achieve a particular characteristic that the designer may deem particularly desirable or helpful. These modifications are well within the knowledge of a designer having ordinary skill in the art. In addition, various embodiments may have disclosed a particular modification to a primary embodiment. A design will be able to easily understand how to incorporate multiple changes to the design as disclosed and will also understand which changes cannot be incorporated in the same structure. A designer can do these substitutions without undue experimentation.

This detailed description in connection with the drawings is intended principally as a description of the presently preferred embodiments of the invention and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:

1. An assembly for minimizing the disengagement of a chain from a chain ring, comprising:
   an inboard leg;
   an outboard leg;
   a first mating portion on the inboard leg; and
   a second mating portion on the outboard leg;
      wherein the first mating portion and the second mating portion interlock with one another to connect the inboard leg to the outboard leg;

wherein relative rotation of the inboard leg and the outboard leg in a first direction causes the first mating portion to interlock with the second mating portion; and wherein relative rotation of the inboard leg and the outboard leg in a second direction causes the first mating portion to become disengaged from the second mating portion, thereby allowing the removal of the outboard leg from the inboard leg.

2. The assembly for minimizing the disengagement of a chain from a chain ring according to claim 1, wherein the first mating portion comprises a first projection.

3. The assembly for minimizing the disengagement of a chain from a chain ring according to claim 1, wherein at least one of the first mating portion and the second mating portion comprises an angled portion.

4. The assembly for minimizing the disengagement of a chain from a chain ring according to claim 3, wherein the angled portion is capable of deforming another mating portion.

5. The assembly for minimizing the disengagement of a chain from a chain ring according to claim 1, further comprising a lock capable of further securing the inboard leg and the outboard leg to one another.

6. The assembly for minimizing the disengagement of a chain from a chain ring according to claim 1, further comprising a stop.

7. The assembly for minimizing the disengagement of a chain from a chain ring according to claim 6, wherein the stop comprises a finger on one of the inboard leg and the outboard leg that is capable of engaging the other of the inboard leg and the outboard leg.

8. The assembly for minimizing the disengagement of a chain from a chain ring according to claim 1, further comprising a shaft.

9. The assembly for minimizing the disengagement of a chain from a chain ring according to claim 8, further comprising a sleeve at least substantially surrounding the shaft.

10. An assembly for minimizing the disengagement of a chain from a chain ring, comprising:
   an inboard leg;
   an outboard leg;
   a first mating portion on the inboard leg; and
   a second mating portion on the outboard leg;
      wherein the first mating portion and the second mating portion interfit interlock with one another to connect the inboard leg to the outboard leg;
      wherein the interlocking of the first mating portion and the second mating portion is capable of interlocking the inboard leg to the outboard leg laterally;
      wherein the interlocking of the first mating portion and the second mating portion prevents the removal of the outboard leg from the inboard leg; and
      wherein the outboard leg is configured to rotate relative to the inboard leg when the inboard leg and the outboard leg are interlocked with one another.

11. The assembly for minimizing the disengagement of a chain from a chain ring according to claim 10, wherein the first mating portion comprises a first projection.

12. The assembly for minimizing the disengagement of a chain from a chain ring according to claim 11, wherein the second mating portion comprises a second projection.

13. The assembly for minimizing the disengagement of a chain from a chain ring according to claim 10, wherein at least one of the first mating portion and the second mating portion comprises an angled portion.

14. The assembly for minimizing the disengagement of a chain from a chain ring according to claim 10, wherein the rotation of the outboard leg relative to the inboard leg causes frictional engagement between the inboard leg and the outboard leg.

15. The assembly for minimizing the disengagement of a chain from a chain ring according to claim 10, further comprising a stop.

16. The assembly for minimizing the disengagement of a chain from a chain ring according to claim 15, wherein the stop comprises a finger on one of the inboard leg and the outboard leg that is capable of engaging at least one stop surface on the other of the inboard leg and the outboard leg.

17. The assembly for minimizing the disengagement of a chain from a chain ring according to claim 16, wherein the at least one stop surface comprises a recess on a face of the inboard leg.

18. The assembly for minimizing the disengagement of a chain from a chain ring according to claim 16, wherein the at least one stop surface comprises a first stop surface and a second stop surface.

19. The assembly for minimizing the disengagement of a chain from a chain ring according to claim 10, further comprising a shaft.

20. The assembly for minimizing the disengagement of a chain from a chain ring according to claim 19, further comprising a sleeve at least substantially surrounding the shaft.

* * * * *

UNITED STATES PATENT AND TRADEMARK OFFICE
CERTIFICATE OF CORRECTION

PATENT NO. : 12,208,860 B2
APPLICATION NO. : 17/494219
DATED : January 28, 2025
INVENTOR(S) : Scott Winans and Sean Gregory Mailen Page 1 of 1

It is certified that error appears in the above-identified patent and that said Letters Patent is hereby corrected as shown below:

In the Claims

In Column 15; Line 47, under Claim 10:
Delete the word "interfit".

Signed and Sealed this
Twenty-fifth Day of February, 2025

Coke Morgan Stewart
*Acting Director of the United States Patent and Trademark Office*